(12) United States Patent
Ido et al.

(10) Patent No.: US 6,671,438 B2
(45) Date of Patent: Dec. 30, 2003

(54) OPTICAL WAVEGUIDE, OPTICAL MODULE, AND THEIR FABRICATION METHOD

(75) Inventors: Tatemi Ido, Kodaira (JP); Takamitsu Nagara, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/814,686

(22) Filed: Mar. 15, 2001

(65) Prior Publication Data

US 2002/0051607 A1 May 2, 2002

(30) Foreign Application Priority Data

Nov. 1, 2000 (JP) .......................... 2000-334196

(51) Int. Cl.$^7$ ................................................ G02B 6/30
(52) U.S. Cl. ........................................................ 385/49
(58) Field of Search ............................... 385/39, 43, 48, 385/49, 50, 51, 52, 137

(56) References Cited

U.S. PATENT DOCUMENTS

| | | | | |
|---|---|---|---|---|
| 6,003,222 | A | * 12/1999 | Barbarossa | 29/600 |
| 6,021,239 | A | * 2/2000 | Minami et al. | 385/36 |
| 6,083,843 | A | * 7/2000 | Ohja et al. | 438/710 |
| 6,115,519 | A | * 9/2000 | Espindola et al. | 385/43 |
| 6,124,080 | A | * 9/2000 | Mizuta et al. | 430/321 |
| 6,134,362 | A | * 10/2000 | Au-Yeung et al. | 385/43 |
| 6,141,366 | A | * 10/2000 | Yoneda | 372/50 |
| 6,157,759 | A | * 12/2000 | Seo et al. | 385/49 |
| 6,316,281 | B1 | * 11/2001 | Lee et al. | 438/31 |
| 6,366,727 | B1 | * 4/2002 | Nojiri et al. | 385/123 |

FOREIGN PATENT DOCUMENTS

| | | |
|---|---|---|
| JP | 7-174930 | 7/1995 |
| JP | 8-29638 | 2/1996 |
| JP | 9-197178 | 7/1997 |
| JP | 10-288717 | 10/1998 |
| JP | 11-202158 | 7/1999 |
| JP | 2000-47055 | 2/2000 |
| WO | WO98/37445 | 8/1998 |

OTHER PUBLICATIONS

1996 IEICE General Conference, vol. Electronics, 1, SC-2-8, pp. 444-445.

* cited by examiner

Primary Examiner—Lynn D. Feild
Assistant Examiner—Thanh-Tam Le
(74) Attorney, Agent, or Firm—Mattingly, Stanger & Malur, P.C.

(57) ABSTRACT

It is a problem of disclosed technology to provide a polymer optical waveguide substrate having a V-groove for fiber alignment providing optical coupling with an optical fiber with low loss.

According to a resolution means therefor, there is provided an optical waveguide member characterized in that an optical waveguide is formed at a portion over a silicon substrate, a core or a clad of the optical waveguide comprises a polymer resin, a groove in a shape of V for positioning and fixing an optical fiber to the optical waveguide is provided to the silicon substrate and a groove in a rectangular shape extended in a direction orthogonal to the groove in the shape of V at a boundary of the V-groove and the optical waveguide, is provided to the silicon substrate, a film thickness of the core or the clad constituting the optical waveguide becomes thinner at a vicinity of the boundary than a film thickness of other portion and the shape of the groove having the shape of V is set such that when the optical fiber is mounted to the V-groove in the shape of V, a height of a center of a core of the optical fiber becomes lower than a height of the core of the optical waveguide at a position sufficiently remote from the boundary and highly efficient optical coupling is achieved between the optical fiber and the optical waveguide.

14 Claims, 14 Drawing Sheets

V-GROOVE REGION | WAVEGUIDE REGION

OPTICAL WAVEGUIDE, OPTICAL MODULE, AND THEIR FABRICATION METHOD

BACKGROUND OF THE INVENTION

The present invention relates to an optical waveguide used in optical communication or the like. Further, the present invention particularly relates to a method of fabricating a polymer optical waveguide substrate having a structure of a V-groove for fiber alignment used in mounting an optical fiber to an optical waveguide.

In recent years, with an object of high function formation and small-sized formation of an optical module for communication, there is investigated an optical module using a silica optical guide. Already, an optical splitter or an arrayed-waveguide-grating wavelength multiplexer and demultiplexer or the like using a silica optical waveguide has been reduced to practice. Further, there has been realized a small-sized optical transmitter and receiver module at a low cost by mounting in hybrid, a semiconductor element such as a laser diode or a photodiode on a substrate having a silica optical waveguide. In the meantime, as a material of constituting an optical waveguide, other than silica, polymer resin, that is, polymer has also been investigated. A polymer optical waveguide can be formed by spin coating and therefore, the polymer waveguide is provided with productivity higher than that of a silica optical waveguide and a waveguide substrate can be fabricated at a low cost. Therefore, by using a polymer waveguide in place of a quartz waveguide, drastic low cost formation of the module can be expected. According to the optical module, it is necessary to optically couple an optical waveguide and an optical fiber with low loss. Normally, when a single mode fiber used in optical communication is used, it is necessary to position and fix positions of an optical waveguide and an optical fiber with submicrometer accuracy in order to couple the optical waveguide and the optical fiber with low loss. In order to carry out the operation in a short period of time and at a low cost, there has been investigated to integrate a groove in a shape of V for aligning an optical fiber on a silicon substrate forming the optical waveguide. As examples of forming a V-groove for fiber alignment at a silicon substrate having a silica optical waveguide, there are, for example, Japanese Patent Laid-Open No. 197178/1997, Japanese Patent Laid-Open No. 29638/1996, Proceedings of the 1996 IEICE (The Institute of Electronics, Information and Communication Engineers) General Conference, vol. Electronics 1, SC-2-8, p. 444 and the like.

As an example of forming a polymer optical waveguide after a V-groove has already been fabricated on a substrate, there is pointed out Japanese Patent Laid-Open No. 288717/1998. Further, there is disclosed a method of separately fabricating, positioning and pasting together a polymer optical waveguide and a V-groove structure in Japanese Patent Laid-Open No. 202158/1999 or Japanese Patent Laid-Open No. 47055/2000.

SUMMARY OF THE INVENTION

It is a first object of the embodiment of the present invention to provide an optical waveguide member easy to fabricate at low cost.

It is a second object of the embodiment of the present invention to provide a method of fabricating an optical waveguide member easy to fabricate at low cost.

Particularly, it is an object of the embodiment of the present invention to provide a structure of an optical waveguide member having a polymer optical waveguide substrate having a V-groove and capable of achieving excellent optical coupling by minimizing an increase in loss between an optical fiber and an optical waveguide caused by a nonuniformity in a film thickness of resin.

According to a representative first mode of the embodiment of the present invention, there is provided an optical waveguide member characterized in comprising at least a groove portion in a shape of V, a silicon substrate having a flat region opposed to the groove portion in the shape of V by interposing a second groove portion in a direction of extending the groove portion in the shape of V, an optical waveguide provided along the groove portion in the shape of V, a first resin layer constituting a core layer of the optical waveguide and a second resin layer constituting a clad layer of the optical waveguide above the flat region, wherein thicknesses of the first and the second respective resin layers are reduced at a vicinity of an end face of the flat region opposed to the first groove portion and the shape of the groove in the shape of V is set such that when an optical fiber is mounted to the V-groove in the shape of V, a height of a center of a core of the optical fiber becomes a height lower than a height of a center of the core of the optical waveguide at a portion thereof at which the film thickness more remote from the boundary than the groove in the shape of V is substantially flat. Further, the flat region opposed to the groove portion in the shape of V by interposing the second groove portion, constitutes a portion raised in a projected shape in view from the groove portion having the shape of V. The same goes in the following.

According to a second representative mode of the embodiment of the present invention, there is provided an optical waveguide member characterized in comprising at least a groove portion in a shape of V, a silicon substrate having a flat region opposed to the groove portion in the shape of V by interposing a second groove portion in a direction of extending the groove portion in the shape of V, an optical waveguide provided along the groove portion in the shape of V and opposedly to a predetermined wall face of the second groove portion, a layer of an adhering material, a third resin layer constituting a first clad layer of the optical waveguide, a first resin layer constituting a core layer of the optical waveguide and a second resin layer constituting a second clad layer of the optical waveguide above the flat region, wherein thicknesses of the first, the second and the third respective resin layers are reduced at a vicinity of end faces thereof opposed to the first groove portion.

According to a representative third mode of the embodiment of the present invention, there is provided an optical waveguide member characterized in that an optical waveguide is formed at a portion above a silicon substrate, a core or a clad of the optical waveguide is constituted by a polymer resin, the silicon substrate includes a groove in a shape of V for positioning and fixing an optical fiber to the optical waveguide and a groove extended in a direction orthogonal to the groove in the shape of V at a boundary of the optical waveguide, a film thickness of the core or the clad constituting the optical waveguide becomes thinner at a vicinity of the boundary than other portion thereof and when the optical fiber is mounted to the V-groove in the shape of V, a height of a center of a core of the optical fiber becomes a height lower than a height of the core of the optical waveguide at a desired position from the boundary. In this case, the shape of the groove in the shape of V is designed to constitute a height achieving highly efficient optical coupling between the optical fiber and the optical waveguide.

Main modes of a method of fabricating an optical waveguide member according to the embodiment of the present invention are as follows.

According to a first mode of a method of fabricating thereof, there is provided a method of fabricating an optical waveguide member which is a method of fabricating an optical waveguide member having at least an optical waveguide a core or a clad of which is constituted by a polymer and a groove in a shape of V for positioning and fixing an optical fiber to the optical waveguide above a silicon substrate, the method is characterized in the steps of forming the groove in the desired shape of V directed in a longitudinal direction of the optical fiber at the silicon substrate, thereafter, forming the optical waveguide by coating polymer resins for the optical waveguide and removing the polymer resin films at a region of mounting the optical fiber.

According to a second mode of the method of fabricating thereof, there is provided the method of fabricating an optical waveguide member according to the above-described, characterized in that after forming the optical waveguide, there is formed a groove for dividing the region of optical waveguide and the region of mounting the optical fiber therebetween, successively, polymer resin films of the region of mounting the optical fiber is removed.

According to a third mode of the method of fabricating thereof, there is provided the method of fabricating an optical waveguide member according to the above-described, characterized in that after forming the groove in the desired shape of V directed in a longitudinal direction of the optical fiber at the silicon substrate, there is provided an adhering layer for promoting an adhering performance between the silicon substrate and the polymer at a region of the silicon substrate for leaving a polymer layer, successively, the optical waveguide is formed.

According to a fourth mode of the method of fabricating thereof, there is provided a method of fabricating an optical waveguide member characterized in comprising a step of forming a groove portion in a shape of V at a silicon substrate, a step of forming a layer of an adhering material at an upper face of a region which is a flat region constituting the groove portion in the shape of V and is present in a direction of progressing light of the optical waveguide, a step of forming a first resin layer constituting a core layer of the optical waveguide and a second resin layer constituting a clad layer of the optical waveguide by covering at least upper faces of the groove portion in the shape of V and a flat region constituting the groove portion in the shape of V of the silicon substrate prepared in this way, a step of forming a second groove portion having a wall face opposed to an end face of the optical waveguide and a step of removing a part of at least the first and the second respective resin layers above the groove region.

BRIEF DESCRIPTION OF THE DRAWINGS

FIG. 1(a) is a perspective view thereof and FIG. 1(b) is a sectional view thereof.

DESCRIPTION OF THE PREFERRED EMBODIMENTS

Figure 1A:
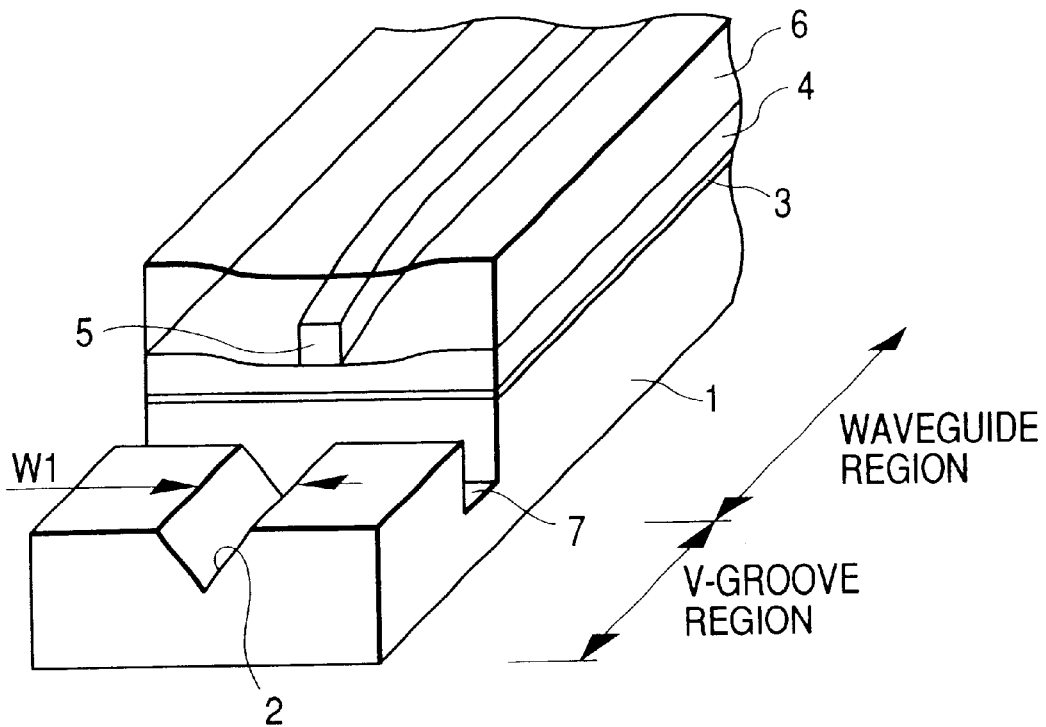
FIGS. 1(a) and 1(b) are views showing a representative example of optical waveguide members according to an embodiment of the present invention.

Before explaining various modes of specific embodiments of the present application, an explanation will be given of various technologies of embodiments of the present invention as well as superiority of the embodiments of the present invention.

According to the above-described example exemplified in the related art, basically, the V-groove for fiber alignment is integrated to a silica optical waveguide and the V-groove is formed by fabricating a silica optical waveguide on a silicon substrate, thereafter removing a silica layer at a portion of the substrate to thereby expose the silicon substrate and wet-etching the silicon substrate by a strong alkaline solution such as KOH. However, when the process is applied to a polymer optical waveguide, generally polymer is not resistant to strong alkali and there poses a problem that the polymer optical waveguide is dissolved or exfoliated from the substrate. The problem can be avoided by forming an optical waveguide by coating polymer after forming a V-groove at the silicon substrate. The method is used in the embodiments of the present invention.

According to a representative example of the present invention, there is fabricated a polymer optical waveguide substrate having a V-groove for fiber alignment in accordance with a procedure shown below. (1) A V-groove for fiber alignment is formed at a silicon substrate by using an anisotropic wet etching. (2) There is provided an inorganic film such as a thermally oxidized silicon film on a surface of the substrate as necessary. (3) There is provided an adhering layer for intensifying adhering force between silicon (inorganic film when the inorganic film is provided on the surface of the substrate) and polymer, at an optical waveguide portion (portion of leaving polymer optical waveguide). (3) There are provided a lower clad layer and a core layer comprising polymer layers by coating and baking varnish over an entire face of the substrate. (4) The core layer is fabricated into an optical waveguide pattern by photolithography and dry etching. (5) There is provided an upper clad layer comprising a polymer layer by coating and baking varnish over the entire face of the substrate. (6) A groove is formed on the silicon substrate by a dicing saw between a V-groove region and a polymer optical waveguide region. (7) The polymer layer at the V-groove region is exfoliated and removed.

Points of the above-described fabrication method are summarized as follows.

The first point is that there is provided a method of fabricating an optical waveguide substrate in which an optical waveguide is formed at a portion above a silicon substrate, a core or a clad of the optical waveguide is constituted by a polymer, there is provided the groove in the V-shape for positioning and fixing an optical fiber to the optical waveguide at the silicon substrate and there is provided a groove in a rectangular shape extended in a direction orthogonal to the V-groove disposed at a boundary between the V-groove and the optical waveguide at the silicon substrate, wherein after forming the V-groove at the substrate, the polymer is coated over the entire face of the substrate to thereby fabricate the optical waveguide.

The second point is that after forming the waveguide, the polymer layer is cut in forming the groove in the rectangular shape and successively only the polymer layer above the V-groove is exfoliated from the substrate.

The third point is that after providing the adhering layer promoting adhering performance between the substrate and polymer only at the optical waveguide portion for leaving the polymer layer of the substrate formed with the V-groove, the optical waveguide is fabricated.

There may be used a resin containing fluorine having poor adhering performance with an inorganic object as the polymer constituting the waveguide. Further, as the adhering layer, there can be used a composite film comprising any or combinations of polyimide silicone resin, polyimide not containing fluorine, organic aluminum compound, organic zirconium compound and organic titanium compound. Particularly, when fluorinated polyimide is used for a material of an optical waveguide, exfoliation can be carried out extremely easily. When fluorinated polyimide is used as a material of an optical waveguide, polyimide silicone, an organic metal oxide film, polyimide not containing fluorine or a composite film of these is preferable as the adhering layer.

According to the material of the optical waveguide of the embodiment of the present invention, in removing the polymer layer in the V-groove after fabricating the waveguide, the polymer layer in the V-groove becomes extremely thick by flowing thereinto and accordingly, there is sufficiently avoided a first difficulty that the polymer becomes difficult to remove by a method of dry etching.

Further, according to the fabrication method of the embodiment of the present invention, there is sufficiently avoided a second difficulty that a characteristic of an optical waveguide and a characteristic of coupling with an optical fiber are deteriorated since the polymer coated on the substrate flows into the V-groove in baking and the clad layer or the core layer is thinned at a vicinity of the V-groove. That is, in order to avoid the second difficulty of the present invention, in the polymer optical waveguide substrate having the V-groove fabricated by coating the polymer after fabricating the V-groove, the width (shape) of the V-groove is set such that the height of the center of the core of the mounted fiber becomes lower than the height of the center of the core of the optical waveguide at a flat region sufficiently remote from the V-groove. When the groove is formed at the boundary by using a dicing saw, the width and the position of the groove are set to cut a region in which the film thickness of the polymer layer is rapidly changed at a vicinity of the V-groove. Particularly, the width of the groove of the boundary is set to 100 $\mu$m through 220 $\mu$m. Particularly, in order to reduce the coupling loss, the height of the center of the core layer measured from the surface of the substrate is set to be equal to or smaller than 15 $\mu$m. Particularly, in order to minimize loss caused, there is provided an inorganic film such as a thermally oxidized film between the adhering layer and the silicon substrate and the inorganic film is operated as a clad layer for preventing light from leaking to the silicon substrate. The thickness of the lower clad layer is ensured to be equal to or larger than 2 $\mu$m and the thickness of the adhering layer is set to be equal to or smaller than 0.5 $\mu$m such that the optical coupling loss is not deteriorated.

In Japanese Patent Laid-Open No. 288717/1998, although a polymer optical waveguide is formed after a V-groove has already been fabricated at a substrate, the above-described difficulty is not avoided. Further, in the embodiment, the cost is high since an extremely thick metal layer is necessary to form on the substrate. Further, according to the method of separately forming, positioning and pasting together a polymer optical waveguide and a V-groove structure as other approach, for example, Japanese Patent Laid-Open No. 202158/1999 or Japanese Patent Laid-Open No. 47055/2000, operation of positioning and fixing the both members with submicrometer accuracy, actually requires extremely high cost. In comparison therewith, according to the embodiment of the present invention, there can be provided an optical waveguide member having high function at an extremely low cost.

Figure 1B:
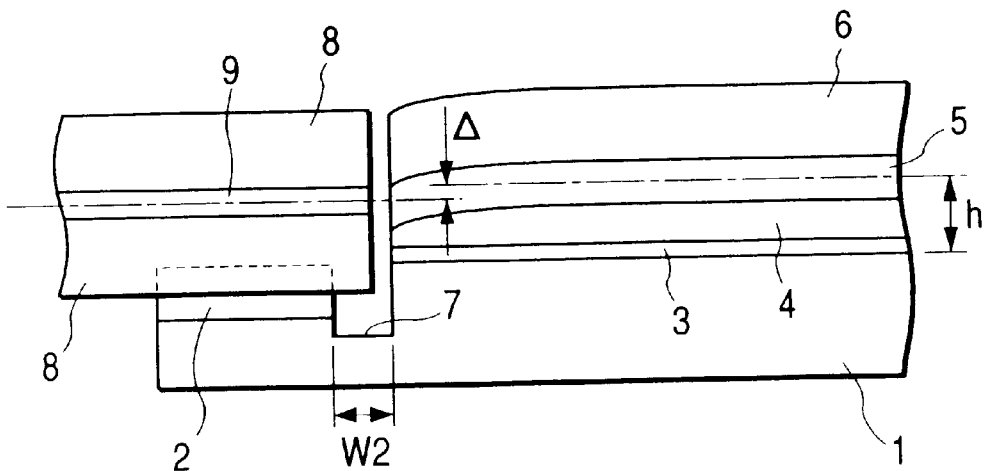

FIGS. 1(a) and 1(b) show a polymer optical waveguide substrate having a V-groove for fiber alignment according to an embodiment of the present invention and FIGS. 2(a), 2(b), 2(c), 2(d), 2(e), 2(g) and 2(f) and FIGS. 3(a), 3(b), 3(c), 3(d), 3(e), 3(f) and 3(g) show a process of fabricating the optical waveguide substrate. FIG. 1(a) is a perspective view of principal portions thereof and FIG. 1(b) is a sectional view taken along a face in parallel with a direction in which light advances. FIGS. 2(a), 2(b), 2(c), 2(d), 2(e), 2(f) and 2(g) are perspective views successively showing a process of fabricating thereof and FIGS. 3(a), 3(b), 3(c) 3(d), 3(e) 3(f) and 3(g) are sectional views successively showing the fabrication process. The sectional views are sectional views taken along a face in parallel with a direction in which light advances and respective views of FIGS. 3(a), 3(b) and so on show states in correspondence with FIGS. 2(a) and 2(b) and so on. An explanation will be given of an outline of a method of fabricating the optical waveguide substrate according to the embodiment of the present invention and a structure for realizing optical coupling with an optical fiber with low loss in the optical waveguide substrate in reference to the drawings. Further, FIG. 1(a) is a perspective view of optical waveguide members in correspondence with FIG. 2(g) and FIG. 1(b) is a sectional view showing a state of mounting an optical fiber thereto. Notation 9 designates a core of an optical fiber and notation 8 designates a clad thereof.

The optical waveguide substrate is fabricated by the following process. A V-groove for fiber alignment 2 is formed at a silicon substrate 1 by using normal anisotropic wet etching (FIG. 2(a), FIG. 3(a)).

There is provided an adhering layer 3 for ensuring adhering performance between a polymer and the substrate over an entire face of the substrate by a method of spin coating or the like. By using a photoresist step and etching, the adhering layer at a V-groove region of the silicon substrate 1 is removed (FIG. 2(b), FIG. 3(b)). Here, as the adhering layer 3, there can be used an organic metal compound provided by coating and baking organic metal chelate or an ester solution of aluminum, zirconium or titanium, or silicone resin containing silicone, or a resin not containing fluorine or a composition of them. The organic metal compound per se sufficiently comprise that disclosed in Japanese Patent Laid-Open No. 174930/1995 or the like. Further, the silicone resin or the resin not containing fluorine per se sufficiently comprises that disclosed in International Patent Publication WO98/37445.

Further, as a resin not containing fluorine or substantially not containing thereof, there can be further pointed out polyimide, polyamide, polycarbonate, acrylic resin or the like.

Here, even when the film thickness of the adhering layer 3 is comparatively thinned to be equal to or smaller than 0.1 μm in the case of an organic metal film and equal to or smaller than 0.5 μm the case of a resin, practically sufficient adhering strength is achieved. Accordingly, the thickness formed in the adhering layer in the V-groove is sufficient to be equal to or smaller than several μm at most even when the thickness is increased by flowing of a solution into the V-groove. Therefore, the adhering layer in the V-groove is removed by wet etching or dry etching without hindrance.

Figure 2A:
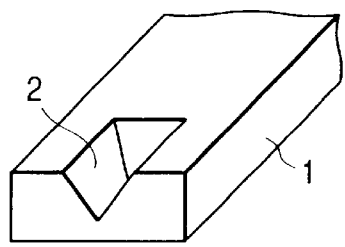
FIGS. 2(a), 2(b), 2(c), 2(d), 2(e), 2(f) and 2(g) are views for explaining a method of fabricating optical waveguide members according to an embodiment of the present invention.
Figure 2B:
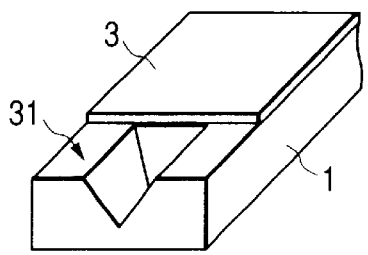
Figure 2C:
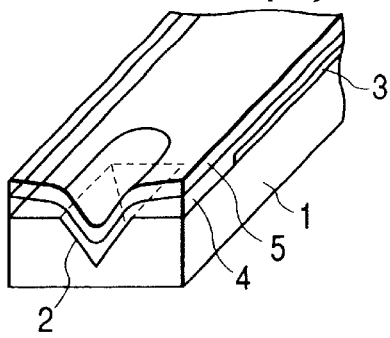
Figure 2D:
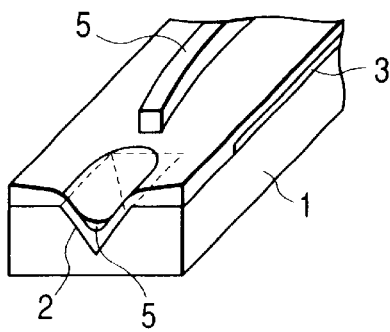
Figure 3A:
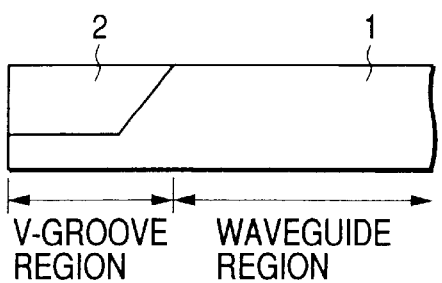
FIGS. 3(a), 3(b), 3(c), 3(d), 3(e), 3(f) and 3(g) are sectional views in correspondence with FIGS. 2(a), 2(b), 2(c), 2(d), 2(e), 2(f) and 2(g) for explaining the fabrication method of the embodiment of the present invention.
Figure 3B:
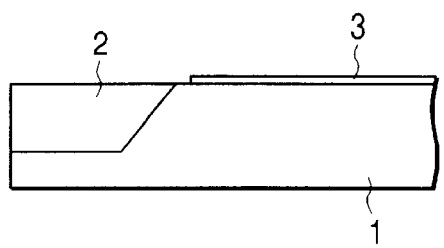
Figure 3C:
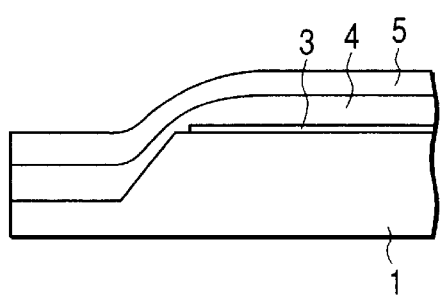
Figure 3D:
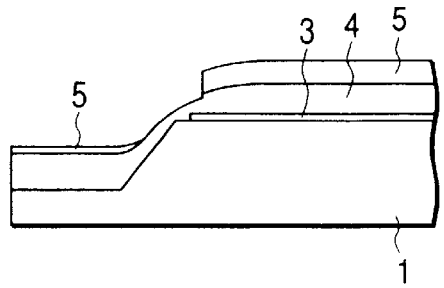

Next, two kinds of polymers having different refractive indices are coated and baked to thereby provide a lower clad layer 4 and a core layer 5 (FIG. 2(c), FIG. 3(c). These layers flow into the V-groove in coating and baking and accordingly, these layers become thick in the V-groove and thin at a vicinity of the V-groove. Further, by using normal photoresist step and dry etching, the core layer 5 is etched to a desired shape to thereby form an optical waveguide pattern 5 (FIG. 2(d), FIG. 3(d).

Figure 2E:
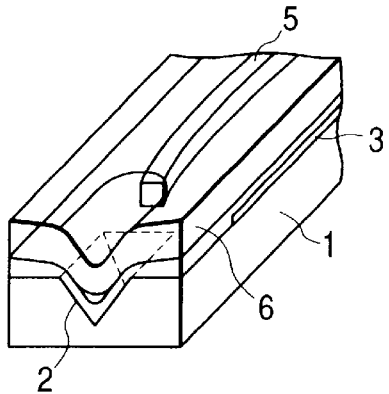
Figure 3E:
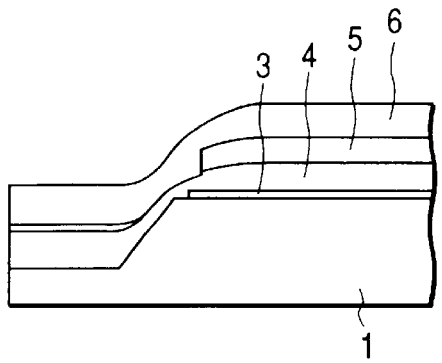

Again, the polymer is coated and baked to thereby provide an upper clad layer (FIG. 2(e), FIG. 3(e). Further, here, as polymer resin for constituting the optical waveguide, there can be used fluorinated polyimide, fluorinated polycarbonate, fluorinated acrylate, deuterated silicone, deuterated acrylate or the like.

Figure 2F:
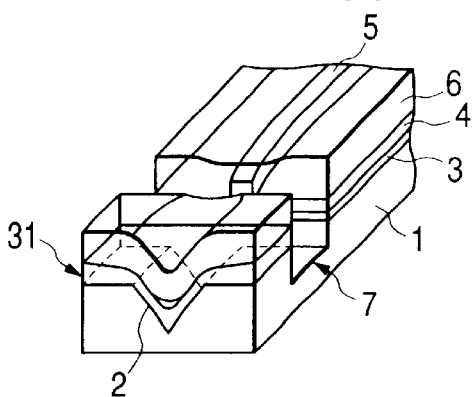
Figure 2G:
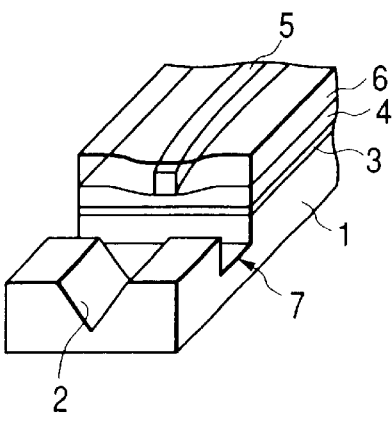
Figure 3F:
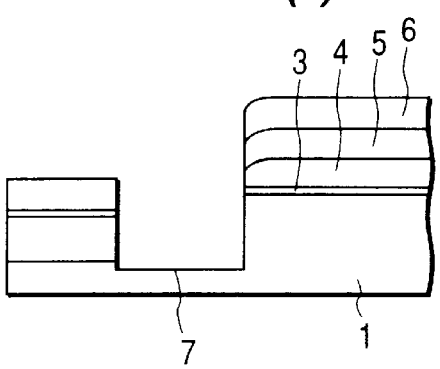
Figure 3G:
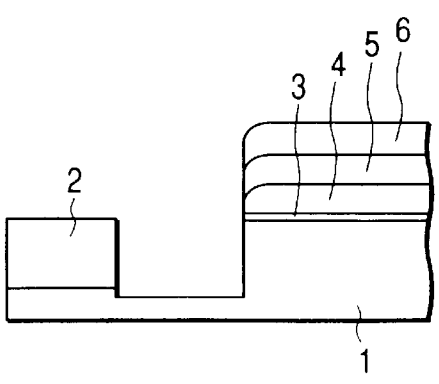

Next, there is provided a groove 7 in a rectangular shape at a boundary between the V-groove region and the waveguide region by using a dicing apparatus (FIG. 2(f), FIG. 3(f). Thereby, polymer layers at the V-groove region and the waveguide region are separated from each other. The polymer layer of the V-groove region 31 can be exfoliated from the substrate since the adhering layer 3 is not present, thereby, the optical waveguide substrate having the V-groove is finished (FIG. 2(g), FIG. 3(g).

According to the embodiment of the present invention, the unnecessary polymer layer of the V-groove region 31 is removed by exfoliation and accordingly, the polymer layer in the V-groove 2 may be extremely thick with no hindrance. In contrast thereto, when the polymer layer of the V-groove region is intended to remove by using, for example, dry etching, since the thickness of the polymer layer is 20 μm through 30 μm even at a flat portion and the thickness is substantially doubled at inside of the V-groove, there poses a problem that etching time period is extremely prolonged or residue of etching is produced in the groove since the groove is deep. Further, also in the case of using wet etching, there poses a problem that significant side etching is caused since the film thickness is extremely thick.

In carrying out the embodiment of the present invention, to facilitate exfoliation of the polymer layer at the V-groove region, it is necessary to select a polymer material having poor adhering performance with the surface of the substrate at the lower clad layer. It is generally known that according to a polymer (fluorinated polymer) including fluorine, C (carbon)—F (fluorine) bond is chemically stable and therefore, chemical bond is difficult to cause at an interface and adhering performance between silicon or silicon oxide and an inorganic object is extremely weak. Therefore, when a resin including fluorine is used at the lower clad layer, the above-described exfoliating step can easily be carried out. Further, when polyimide is used as a polymer material, in coating and baking polyimide, there causes dehydration referred to as imide formation, significant volume contraction is caused and accordingly, large tensile stress is produced in the film and the exfoliation is easy to cause. Therefore, when fluorinated polyimide is used at the lower clad, the exfoliation can be carried out extremely easily. When such polymer materials are specifically enumerated, there can be pointed out, for example, fluorinated polyimide, fluorinated polycarbonate, fluorinated acrylate, tetrafluoroethylene resin and the like.

Next, a description will be given of structural conditions for providing optical coupling with low loss between an optical fiber and a polymer optical waveguide in the polymer optical waveguide substrate having the V-groove for fiber alignment fabricated by coating polymer to the silicon substrate previously provided with the V-groove.

Figure 6A:
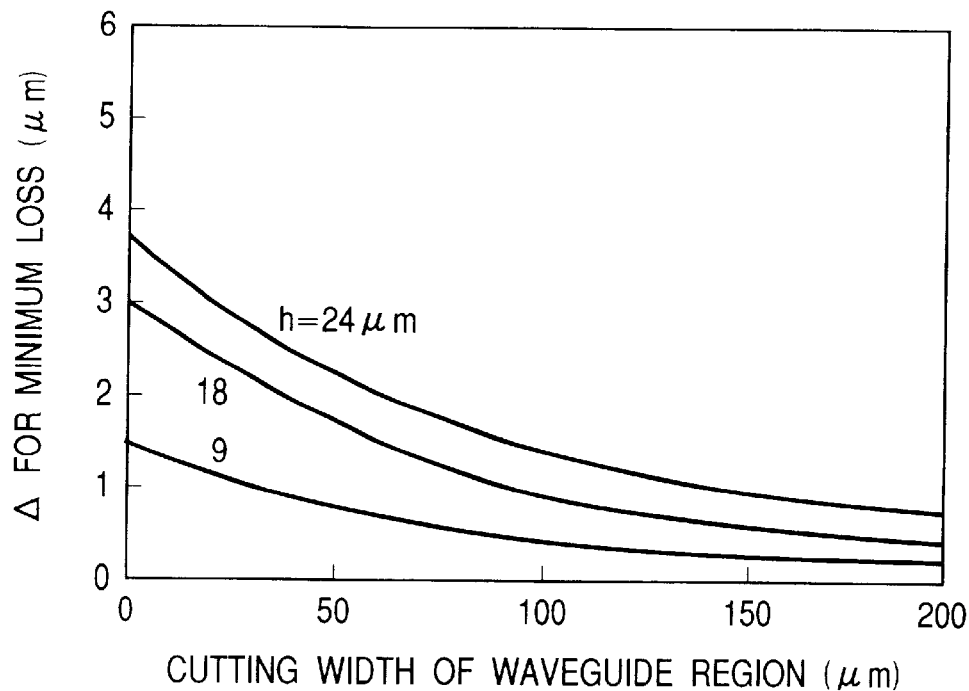
FIGS. 6(a) and 6(b) illustrate diagrams showing an example of a relationship between a shift amount for minimizing coupling loss of an optical fiber and an optical waveguide and the coupling loss provided as a result in a polymer optical waveguide substrate having a V-groove according to an embodiment of the present invention.
Figure 6B:
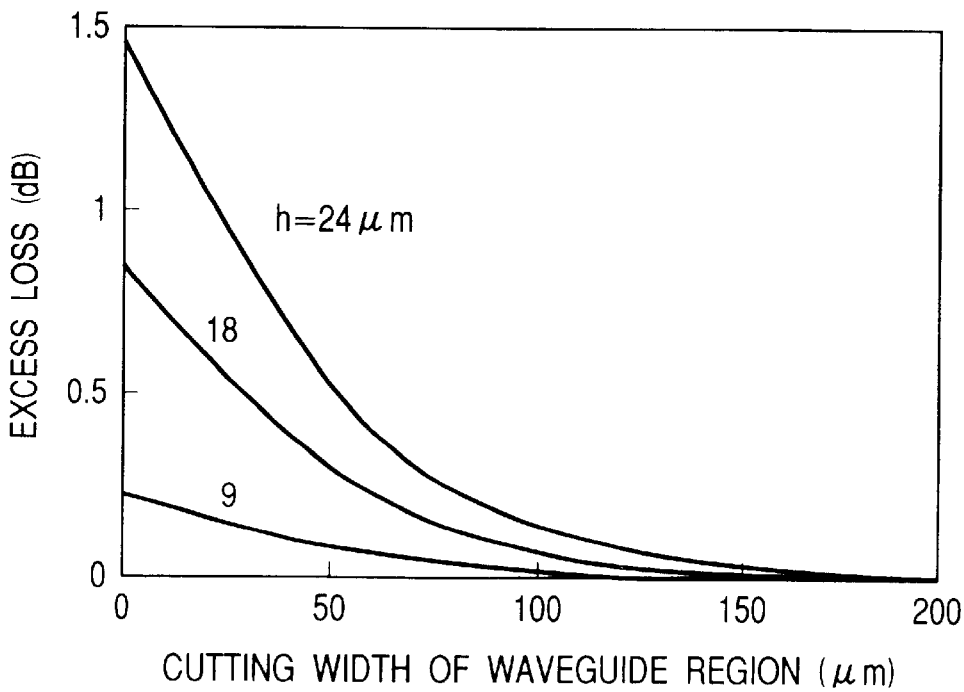

As described above, when the optical waveguide is fabricated after fabricating the V-groove, the lower clad layer, the core layer and the clad layer are thinned at a vicinity of the V-groove and there is a concern that a propagation characteristic of the waveguide and a coupling characteristic thereof with an optical fiber are deteriorated. However, in carrying out the embodiment of the present invention, the deterioration can be suppressed to be extremely inconsiderable (for example, <0.1 dB) by setting a width and a position of the dicing groove 7, a width (W1) of the V-groove (that is, height of core of mounted optical fiber) or height of the core of the waveguide in predetermined ranges. FIG. 6 shows a result of numerical calculation in consideration of a change in a thickness of a coated film at a vicinity of the V-groove.

Figure 4:
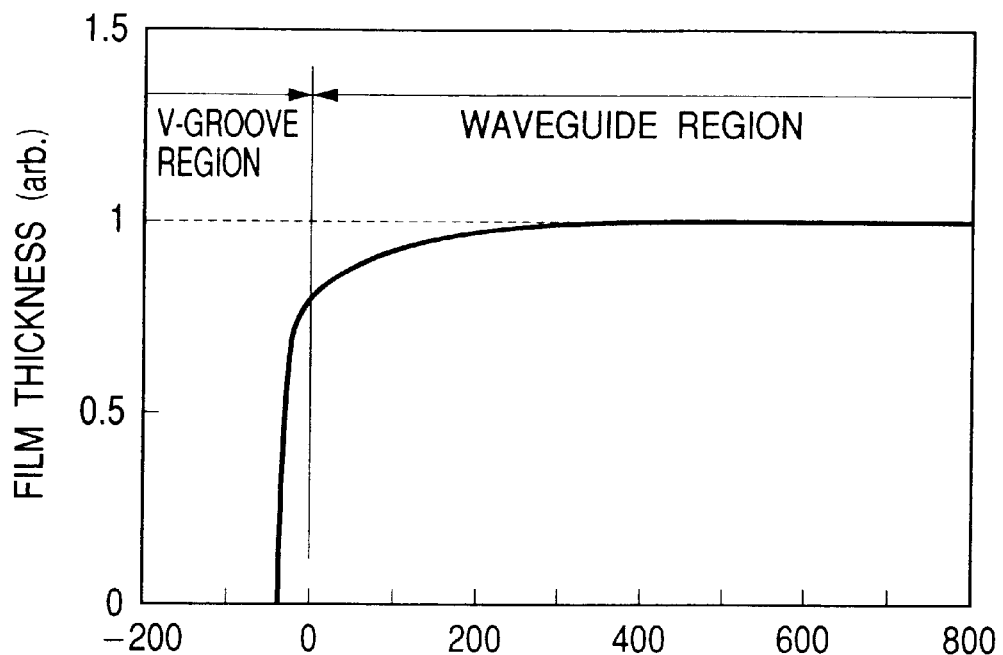
FIG. 4 is a diagram showing a film thickness distribution of a polymer when the polymer is coated on a silicon substrate having a V-groove.
Figure 5:
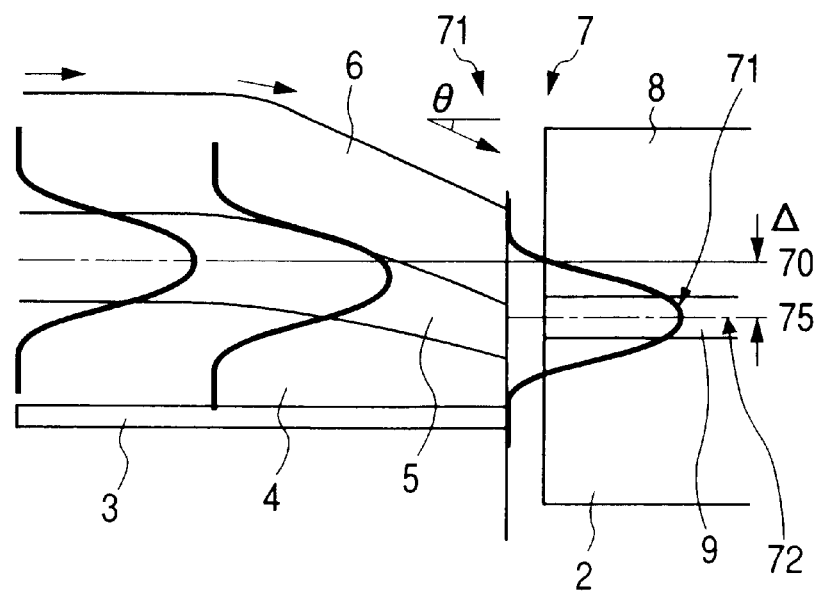
FIG. 5 is a view for explaining a state of propagation of light of an optical waveguide (optical intensity distribution) in the polymer optical waveguide substrate having the V-groove according to an embodiment of the present invention.

FIG. 4 shows a change in a film thickness at a vicinity of a V-groove when a polymer is coated on a substrate having the V-groove. The graph shows experimental data provided by coating fluorine polyimide varnish to the substrate having the V-groove and based thereon, the above-described calculation is carried out. The abscissa of FIG. 4 indicates a position along a direction of advance of light in the waveguide structure and the ordinate indicates a thickness of a coated organic resin layer by a relative value. As shown by FIG. 4, when the film thickness is changed such that the film thickness is thinned in accordance with approaching the V-groove, a peak of an intensity distribution of light propagating in the optical waveguide, is shifted to a lower side as approaching the V-groove. FIG. 5 is a view for explaining the state. The lower clad layer 4, the core layer 5 and the upper clad layer 6 are mounted over the adhering layer 3 and as described above, at a vicinity 71 of the V-groove 7, thicknesses of these layers constituting the optical waveguide are relatively thinned. In order to prevent optical coupling loss by the shift of the position from increasing, the position of the optical fiber is lowered such that the peak 71 of the optical intensity of an end of the optical waveguide coincides with a center 72 of the core of the optical fiber. This is specifically to widen the width W1 of the V-groove 2 of the silicon substrate 1. In the case of mounting the optical fiber on the V-groove 2. when the width of the V-groove 2 is wide, the position of the optical fiber is lowered. In FIG. 5, a shift amount of height of the optical fiber is designated by notation Δ. Further, the width of the V-groove is exemplified in, for example, FIG. 1 as notation W1. Caution is required here that since the optical waveguide is bent to the lower side at a vicinity of an end face, the peak of the optical intensity at the end face is slightly upward from the center of the core. Therefore, in order to minimize the coupling loss, W1 is set such that the center of the core of the optical fiber becomes lower than the center of the core of the optical waveguide at a flat portion and higher than the center of the core of the waveguide at the end face.

FIGS. 6(*a*) and 6(*b*)show an example of a calculation of a relationship between the shift amount Δ of the height of the optical fiber and an increase in the coupling loss between the optical fiber and the optical waveguide. In FIG. 6(*b*), 0 dB is set to a case in which there is not a change in a film thickness of polymer by the V-groove. The abscissas of FIGS. 6(*a*) and 6(*b*) indicate a cutting width of a waveguide region in forming the dicing groove 7, notation h designates a height of the center of the core of the optical waveguide from the substrate at a flat portion (FIG. 1(*b*). FIG. 6(*a*) shows the shift amount Δ of the height of the optical fiber minimizing loss and FIG. 6(*b*) exemplifies the increase in the coupling loss. According to the calculation example, the refractive index of polymer is 1.52, a difference between refractive indices of the core and the clad is 0.4% and the size of the core is 6×6 μm at the flat portion. The main cause that increase in the loss remains even when the height of the optical fiber is adjusted, resides in that since the optical waveguide is bent, a direction of emitting light emitted from the optical waveguide is provided with an inclination θ The inclination is exemplified as notation θ in FIG. 5.

In order to reduce the increase in the loss, the width of the waveguide region cut by dicing may be increased. Further, the film thickness of the polymer layer at the vicinity of the V-groove is changed extremely sensitively by process condition of coating or the like and accordingly, also from a view of stability, it is preferable to cut a region in which the film thickness at the vicinity of the V-groove is rapidly changed as much as possible. However, in the meantime, when the width of the dicing groove is increased, a distance between the V-groove for aligning the optical fiber and the end face of the waveguide becomes large and accordingly, a dispersion in the core position at the end face of the optical waveguide caused by bending the optical fiber is increased and there poses a problem that a dispersion in the coupling loss becomes large. In consideration of the both factors, it is preferable that a width (W2) of the waveguide region to be cut falls in a range of about 50 μm through 170 μm. In consideration of the fact that in order to cut a portion of the V-groove region where the V-groove becomes shallow, the V-groove region must be cut by about 50 μm, it is preferable that the width of the groove formed by dicing is about 100 μm through 220 μm. Further, as is apparent from FIG. 6(*a*), the smaller height h result in the smaller the bending of the waveguide, and thus the smaller increase in the loss. For example, when the width of the waveguide region to be cut is 100 μm, in order to suppress the increase in the loss to be extremely small as being equal to or smaller than 0.05 dB, the height h may be set to be equal to or smaller than 15 μm. However, in a normal optical waveguide of the single mode, in consideration of an efficiency of coupling with an optical fiber, the difference between the refractive indices of the core and the clad is set to 0.3% through 0.6% and therefore, in order to prevent the characteristic of the optical waveguide from deteriorating by leaking light to the silicon substrate, at least 15 μm of the lower clad layer is necessary. Therefore, it is difficult to make the height h equal to or smaller than 15 μm.

Figure 7:
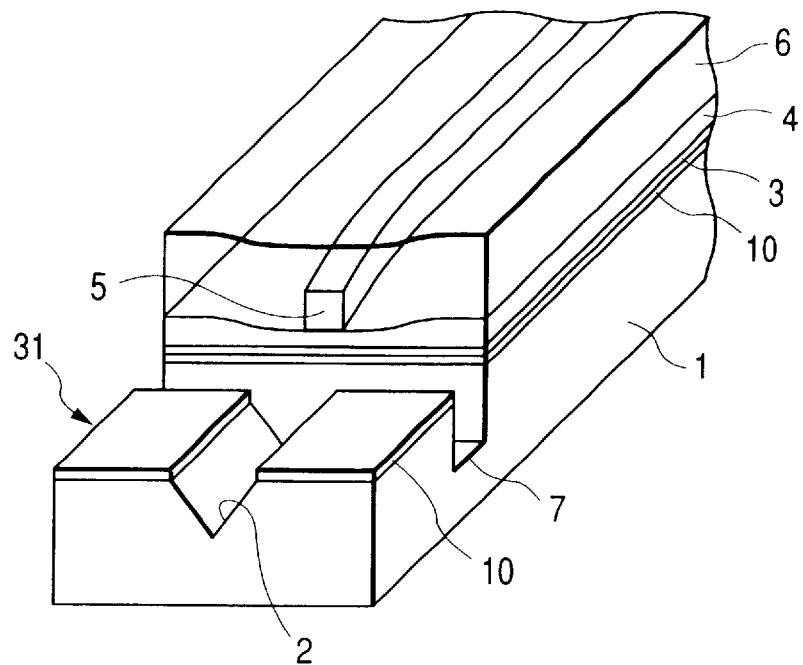
FIG. 7 is a perspective view showing an example of a polymer optical waveguide substrate having a V-groove according to an embodiment of the present invention.

There is a measure thereagainst as shown by FIG. 7. According to the measure, the problem can be resolved by using a structure in which the polymer optical waveguide is formed above an inorganic film 10 having a refractive index lower than that of the lower clad layer and light is confined by constituting the inorganic film 8 as a portion of the lower clad layer. Further, in FIG. 7, other than the inorganic layer is similar to that which has been explained. For example, in the case of using a polymer having the refractive index of about 1.5 at the lower clad layer, when a silicon oxide film (refractive index 1.46) is used as the inorganic film 10, since the difference between the refractive indices of the oxide film and the polymer is large, even when the film thickness of the oxide film is as thin as 1 μm through 2 μm, leakage of light to the silicon substrate can be prevented. Further, at this occasion, when the thickness of the lower clad layer is equal to or larger than 2 μm, a shape of a spot of light propagated in the optical waveguide substantially remains unchanged from that of a conventional structure and excellent optical coupling is achieved. Further, in this case, light propagated in the optical waveguide reaches also the adhering layer 3, however, when the thickness of the adhering layer is set to be thinner than that of the core layer by one digit (for example, 0.5 μm or smaller), a deterioration in the optical characteristic of the optical waveguide caused by the adhering layer can sufficiently be reduced.

A description will be given of respective specific embodiments of the present invention as follows.

<Embodiment 1>

A structure of an optical waveguide substrate having a V-groove for fiber alignment according to Embodiment 1 is shown by FIGS. 1(*a*), 1(*b*) and a method of fabricating thereof is shown by FIGS. 2(*a*), 2(*b*), 2(*c*), 2(*d*), 2(*e*), 2(*f*) and 2(*g*) and FIGS. 3(*a*), 3(*b*), 3(*c*), 3(*d*), 3(*e*), 3(*f*) and 3(*g*).

The substrate is fabricated by the following process. Basic constitutions of the respective drawings are as described above.

First, the silicon wafer 1 having (1, 0, 0) face is formed with 1 μm of a thermally oxidized silicon film. The silicon oxide film in the region of forming the V-groove 2 is removed by a photoresist step and dry etching. By the normal anisotropic etching with regard to silicone crystal using KOH aqueous solution, the V-groove 2 comprising two of (1, 1, 1) faces is formed. The silicon oxide film used as an etching mask is removed by an aqueous solution of hydrofluoric acid (FIG. 2(*a*), FIG. 3(*a*).

The adhering layer 3 (thickness: 0.5 μm) is formed over an entire face of the substrate by spin coating and baking of varnish of polyimide silicone resin (for example, made by Hitachi Chemical Co., Ltd., Commercial name: PIX series) on the substrate formed with the V-groove. The adhering layer of the V-groove region is removed by normal photoresist step and dry etching using oxygen gas (FIG. 2(*b*), FIG. 3(*b*).

By successively coating and baking two kinds of varnishes of fluorinated polyimide having different refractive indices (a solution of N, N-dimethylacetamide of polyamic acid which is precursor of fluorinated polyimide, for example, made by Hitachi Chemical Co., Ltd., Commercial name: OPI series) there are formed the lower clad layer 4 (n (refractive index)=1.520, t (film thickness of flat portion)=15 μm) and the core layer 5 (n=1.526, t=6.0 μm) (FIG. 2(*c*), FIG. 3(*c*). At this occasion, since the varnishes flow into the V-groove, film thicknesses of the lower clad layer 4 and the core layer 5 are thinned at a vicinity of the V-groove. The state is as exemplified in FIG. 4.

By photoresist step and dry etching of oxygen, useless portions of the core layer 5 are removed to thereby form the optical waveguide pattern (FIG. 2(*d*), FIG. 3 (*d*). At this occasion, the core layer 5 can remain in the V-groove since the coated film thickness is thick. By coating and baking again fluorinated polyimide varnish, the upper clad layer (n=1.520, t=20 μm) is provided (FIG. 2(*e*), FIG. 3(*e*). Next, the groove 7 is provided at the boundary between the V-groove region and the waveguide region by using a dicing apparatus. Here, the width (W2) of the groove 7 is set to 150 μm and the position of the groove is set such that the V-groove region is cut by 50 μm and the waveguide region is cut by 100 μm (FIG. 2(*f*) FIG. 3(*f*). When the wafer is cut into an element by dicing, the polymer layer of the V-groove region is spontaneously exfoliated immediately after dicing since the adhering strength with the substrate is weak and the V-groove is exposed (FIG. 2(*g*), FIG. 3 (*g*).

A single mode fiber having the core diameter of 125 μm is mounted and adhered to the V-groove portion of the fabricated optical waveguide having the V-groove and coupling loss between the waveguide and the fiber is evaluated. As a result of comparing the coupling loss with respect to various V-groove width (W1), the loss is minimized in the case of the V-groove width (W1=128.4 μm) constituting the height of the center of the core of the fiber to be 17.5 μm from the surface of the substrate (that is, Δ=h−17.5=1.0 μm and the increase in the coupling loss in this case can be suppressed to 0.1 dB in comparison with the case of not integrating the V-groove.

<Embodiment 2>

FIG. 7 shows a structure of an optical waveguide substrate having a V-groove for fiber alignment according to Embodiment 2. A main point of difference from Embodiment 1 resides in that the substrate is provided with the thermally oxidized silicon film 10 between the adhering layer 3 and the silicon substrate 1.

The substrate is fabricated by the following process. First, similar to Embodiment 1, the silicon wafer 1 having (1, 0, 0) face is formed with the thermally oxidized silicon film 10 (t=2 μm). The oxide film at the region for forming the V-groove is removed by photoresist step and dry etching. The alignment V-groove 2 formed by two of (1, 1, 1) faces is fabricated by anisotropic wet etching using KOH aqueous solution. Different from Embodiment 1, the silicon oxide film 10 used as the etching mask is left on the surface of the substrate as it is.

The adhering layer 3 (thickness: 0.5 μm) is provided over the entire face of the substrate by spin coating and baking of varnish of polyimide silicone resin on the entire face of the substrate. The adhering layer of the V-groove region is removed by resist step and dry etching using oxygen gas. By successively coating and baking two kinds of varnishes of fluorinated polyimide having different refractive indices, the lower clad layer 4 (n=1.520, t=3.5 μm) and the core layer 5 (n=1.526, t=6.0 μm) are formed. The optical waveguide pattern is formed by removing the unnecessary portion of the core layer 5 by photoresist step and dry etching of oxygen. The upper clad layer 6 (n=1.520, t=20 μm) is formed by coating and baking again the varnish of fluorinated polyimide. The groove 7 is provided at the boundary between the V-groove region and the waveguide region by using a dicing apparatus. Here, the width (W2) of the groove 7 is set to 150 μm and the position of the groove is set such that the V-groove region is cut by 50 μm and the waveguide region is cut by 100 μm. When the wafer is cut into an element by the dicing apparatus, since the adhering strength with the substrate of the V-groove region is weak, the polymer layers in the V-groove region are spontaneously exfoliated after dicing and the V-groove is exposed.

A single mode fiber having the core diameter of 125 μm is mounted and adhered to the V-groove portion of the fabricated optical waveguide member having the V-groove and the coupling loss between the waveguide and the fiber is evaluated. As a result of comparing the coupling loss with respect to various V-groove widths, the loss is minimized in the case of the V-groove width (W1=141.0 μm) constituting the height of the optical fiber to be about 6.6 μm from the silicon oxide surface (that is, Δ=h−6.7=0.4 μm) and increase in the loss relative to the case of not integrating the V-groove can be extremely reduced as 0.05 dB. Further, the waveguide shows excellent waveguide characteristic of 0.3 dB/cm at wavelength of 1.3 μm.

Although according to Embodiment 1 and Embodiment 2, there is particularly used polyimide silicone resin having high adhering performance with silicon and silicon oxide, however, as the adhering layer, there may be used an organic metal compound of aluminum, titanium, zirconium or the like. As a method of forming a film of an organic metal compound, there is applicable a method of spin coating chelate solutions or ester solutions of various metals. Further, when a composition of the organic metal compound and polymer not including fluorine (normal polyimide, polyimide silicone resin) is used for the adhering layer, there can be realized a stronger and more highly reliable adhering strength at the optical waveguide portion. As means for etching the adhering layer, other than dry etching using oxygen gas, wet etching using an alkaline solution or hydrofluoric acid solution can be used. Further, although the above-described embodiments are carried out particularly in the case of the single mode of the polymer waveguide and the fiber, the embodiments can naturally be carried out similarly also in the case of a multiple mode of the waveguide and the fiber.

Figure 8:
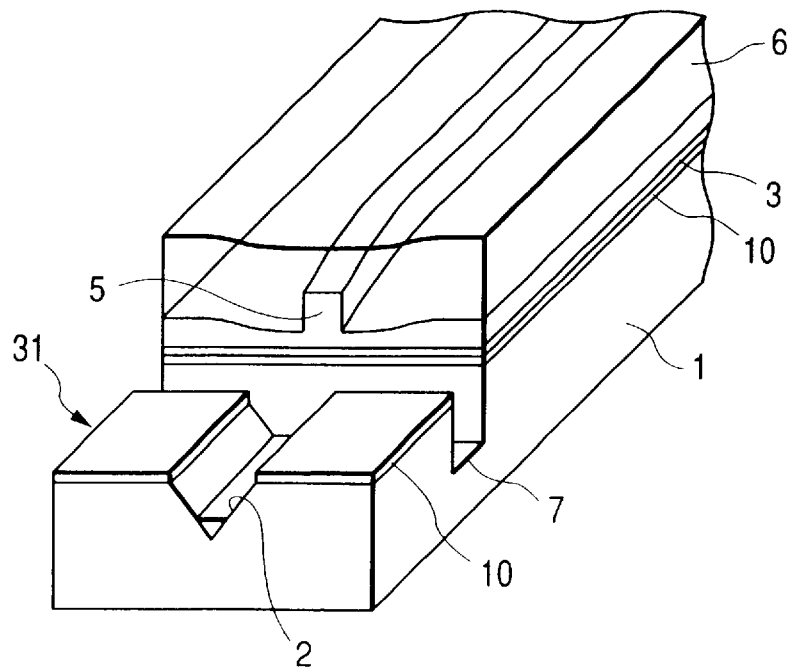
FIG. 8 is a perspective view showing other example of a polymer optical waveguide substrate having a V-groove according to an embodiment of the present invention.

Further, although the above-described optical waveguide is embodied with respect to a waveguide of an embedding type having the lower clad layer 4, the embodiment can naturally be embodied similarly with respect to an optical waveguide which is not provided with a lower clad comprising a polymer and in which the inorganic film 10 is used as the lower clad as shown by FIG. 8. Further, with regard to the shape of the V-groove, etching is not necessarily needed until the bottom of the groove is sharpened and the shape shown in FIG. 8 may naturally be used without hindrance so far as the groove is etched to a degree by which the set optical fiber is not brought into contact with the bottom. The shape of the V-groove 2 is not limited to the embodiment but can naturally be used in the embodiment of the present invention as necessary in view of design.

<Embodiment 3>

Figure 9:
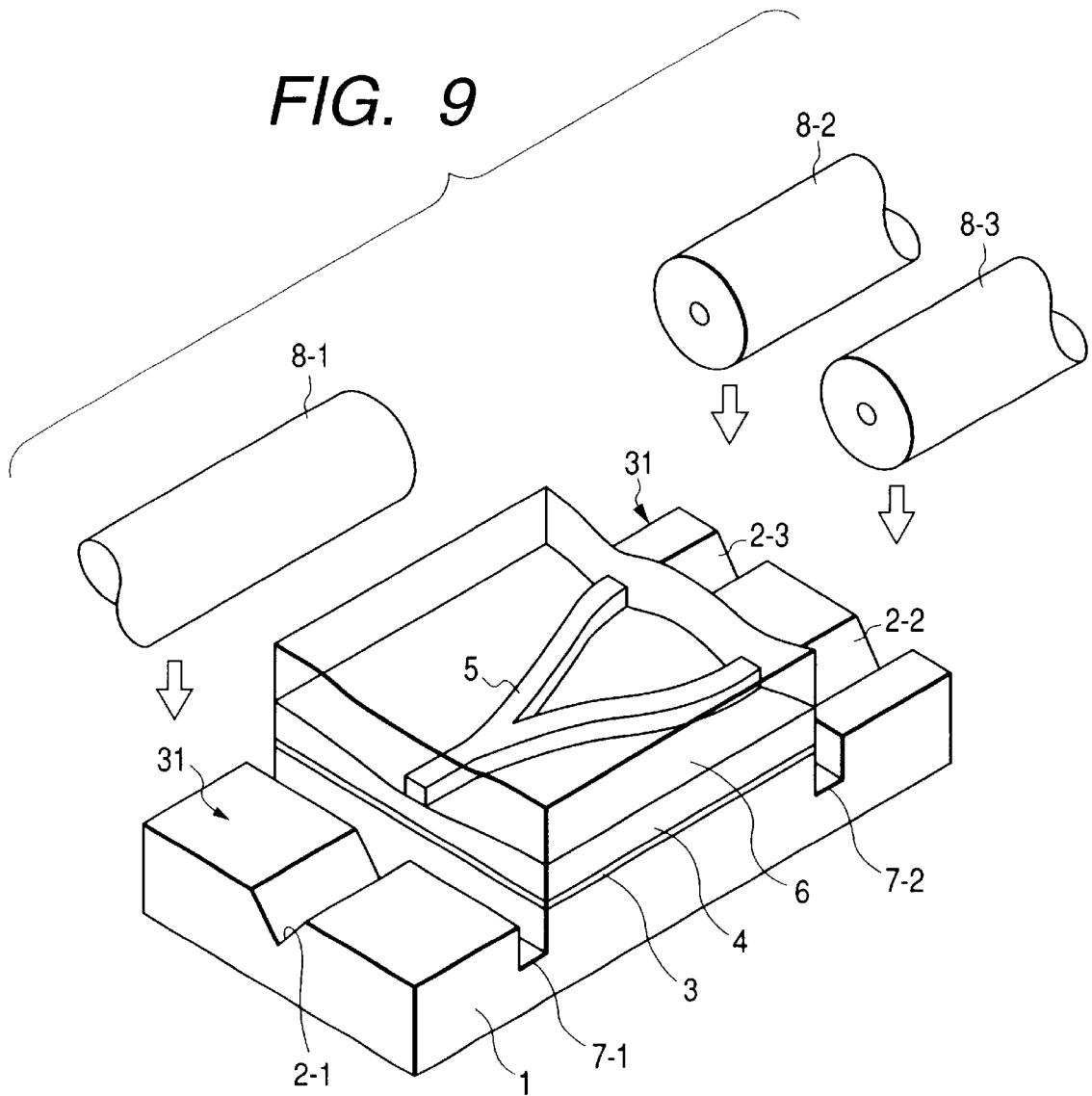
FIG. 9 is a perspective view for explaining an example of an optical splitter module according to an embodiment of the present invention.

A third embodiment of the present invention is an example of a 1=2 splitter module. FIG. 9 shows a perspective view of this example. Portions similar to those in the above-described embodiments are designated by the same notations.

The 1×2 splitter module is fabricated by the following procedure. By a method similar to that in Embodiment 1, V-grooves 2-1 through 2-3 are formed in the silicon substrate 1. Here, a width of the respective V-groove is set to 128.4 $\mu$m and a height of center of a core of the optical fiber to be mounted is set to be 17.5 $\mu$m from the surface of the substrate.

The silicon substrate 1 prepared in this way is subjected to spin coating and baking by an aluminum chelate solution (for example, made by Hitachi Chemicals Co. Ltd., Commercial name: PIQ-coupler) and by coating normal polyimide not including fluorine (for example, made by Hitachi Chemicals Co., Ltd., Commercial name: PIQ), there is provided the adhering layer 3 comprising an organic aluminum oxide film (about 30 $\mu$m) and polyimide (0.5 $\mu$m) over the entire face of the substrate. By a normal photoresist step, dry etching and wet etching of hydrofluoric acid species, the adhering layer of the V-groove region 31 is removed. By successively coating and baking two kinds of fluorinated polyimide varnishes having different refractive indices, the lower clad layer 4 (n=1.520, t=15 $\mu$m) and the core layer 5 (n=1.526, t=6.0 $\mu$m) are formed. By a normal photoresist step and dry etching of oxygen, unnecessary portions of the core layer are removed and a Y-branch pattern of a desired shape is formed.

By coating and baking again fluorinated polyimide varnish, the upper clad layer 6 (n=1.520, t=20 $\mu$m) is provided. By using a dicing apparatus, grooves 7-1 through 7-2 are provided at boundaries between the V-groove regions and the waveguide region. Here, the width of the groove is set to 150 $\mu$m and the position of the groove is set such that the V-groove region is cut by 50 $\mu$m and the waveguide region is cut by 100 $\mu$m. When the wafer is cut into an element by dicing, the V-groove region is spontaneously exfoliated after dicing since an adhering strength thereof is weak and the V-groove is exposed. Three pieces of single mode fibers 8-1 through 8-3 having the core diameter of 125 $\mu$m are mounted to the V-groove portions of the fabricated optical waveguide having the V-grooves and fixed thereto by an UV adhering agent to thereby finish the optical splitter module.

There is achieved an excellent characteristic such that loss of the splitter module (loss between optical fibers 8-1 and 8-2 or 8-1 and 8-3) is equal to or smaller than 4.0 dB.

<Embodiment 4>

Figure 10:
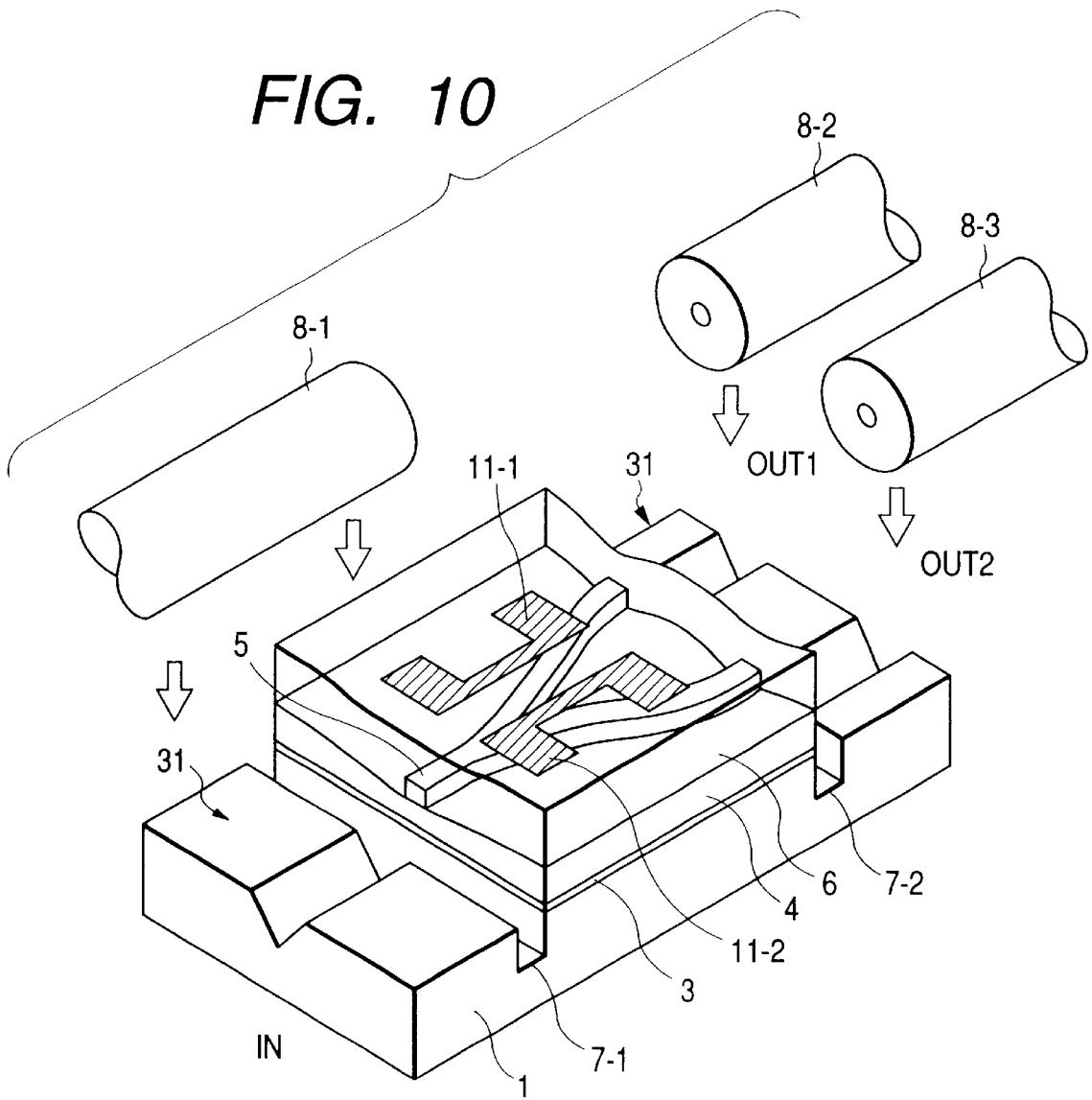
FIG. 10 is a perspective view for explaining an example of an optical switch module according to an embodiment of the present invention.

This example is an example of other 1×2 optical switch. Optical waveguide members of the embodiment of the present invention can naturally be used for such use. FIG. 10 shows a perspective view of a 1×2 optical switch structure according to the present invention. The basic constitution of the optical switch is an example of providing a pair of thin film heaters 11-1 and 11-2 on the surface of the polymer waveguide of the 1×2 optical splitter fabricated in Embodiment 3. The pair of heating means are provided in correspondence with respective branches of the optical waveguide. As the thin film heater, for example, Cr (thickness: t=0.3 $\mu$m) can be used.

By the heating means, optical characteristics of the respective branches of the optical waveguide are controlled and optical intensities of the respective branches of the optical waveguide are controlled. For example, when current is made to flow to the heater 11-1 in a state in which light is incident from IN, the refractive index of the branch of the waveguide right under the heater is reduced and accordingly, an optical output of OUT2 is increased and OUT2 is made ON and an optical output of OUT1 is reduced and OUT1 is made OFF. Further, when current is made to flow to the heater 11-2, the optical output of OUT1 is increased and OUT1 is made ON and the optical output of OUT2 is reduced and OUT2 is made OFF. There is achieved excellent switch characteristic such that an extinction ratio is equal to or larger than 25 dB and loss on the side of ON is 1.5 dB when the embodiment is operated by 150 mW of heater power.

<Embodiment 5>

Figure 11:
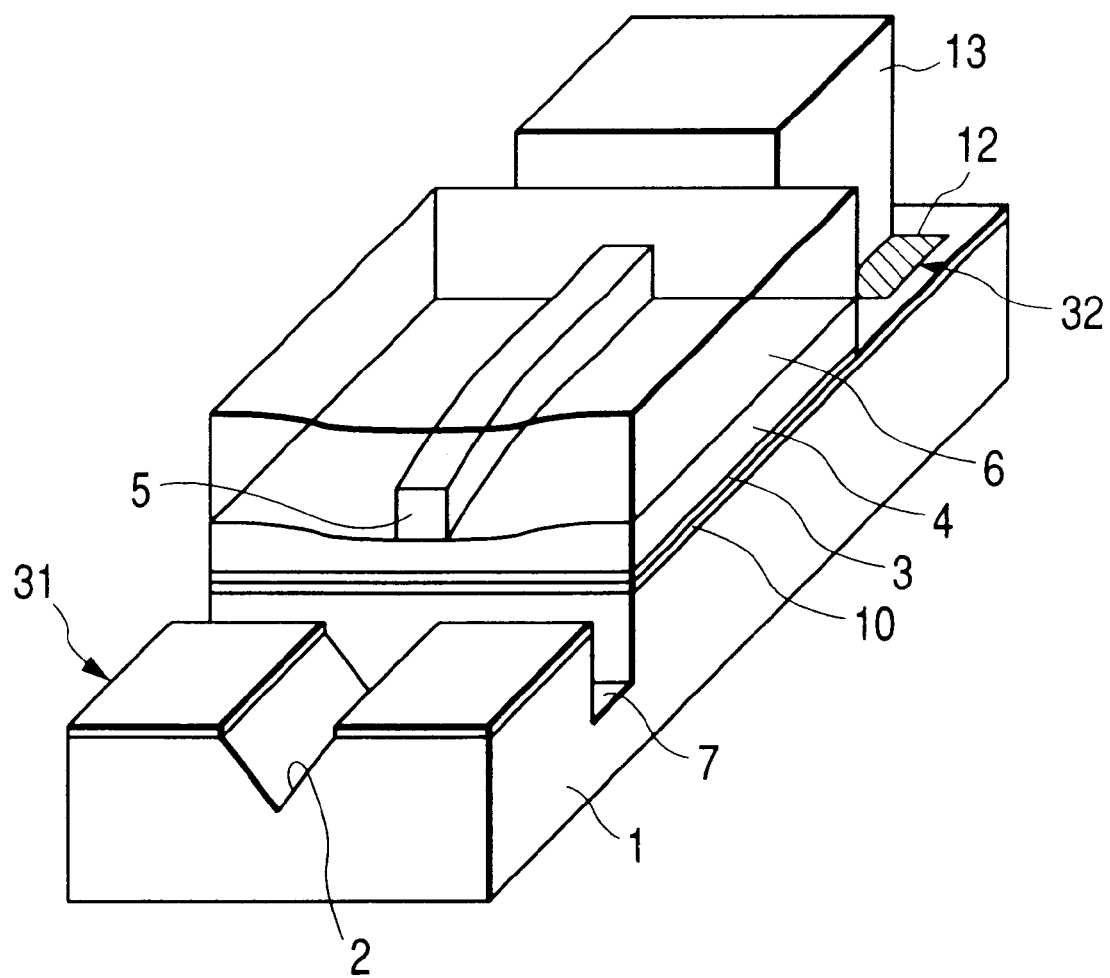
FIG. 11 is a perspective view for explaining an example of an optical transmitter (or optical receiver) module according to an embodiment of the present invention.

This example is an example of an optical transmitter (or optical receiver) module. Optical waveguide members of the embodiment of the present invention can naturally be used for such use. FIG. 11 shows a perspective view of a structure of an optical transmitter (or optical receiver) module according to the embodiment of the present invention.

The module is fabricated by the following process. The V-groove 2 is formed in the silicon wafer 1 by a method similar to that of the previous embodiments. Further, there is provided a thermally oxidized silicon film 10 (t=1.0 $\mu$m) operating as an insulating film of the lower clad layer and an electrode of the optical waveguide at the surface of the substrate. Here, the width of the V-groove is set to 140.2 $\mu$m and the height of the center of a core of a mounted fiber is set to be 8.1 $\mu$m from the surface of the oxidized silicon film. Further, there is provided a Ti/Pt/Au electrode 12 used in mounting a semiconductor element on the silicon oxide film 10.

There is formed the adhering layer 3 (thickness: 0.5 $\mu$m) over the entire face of the substrate by subjecting varnish of polyimide silicone resin to spin coating and baking over the entire face of the silicon substrate 1 prepared in this way. Successively, by a normal photoresist step and dry etching, the adhering layer of the V-groove region 31 is removed. By successively coating and baking two kinds of fluorinated polyimide varnishes having different refractive indices, the lower clad layer 4 (n=1.520, t=5.0 $\mu$m) and the core layer 5 (n=1.526, t=6.0 $\mu$m) are formed. By a photoresist step and dry etching of oxygen, unnecessary portions of the core layer 5 are removed. By coating and baking again fluorinated polyimide varnish, the upper clad layer 6 (n=1.520, t=20 $\mu$m) is provided. By using dry etching, a polymer waveguide of a mounting portion 32 for mounting an optical member is completely removed to thereby expose the electrode 12. By using a dicing apparatus, the groove 7 is provided at a boundary between the V-groove region and the waveguide region. Here, the width of the groove 7 is set to 150 $\mu$m and the position of the groove is set such that the V-groove region is cut by 50 $\mu$m and the waveguide region is cut by 100 μm. When the wafer is cut into a waveguide element by dicing, the polymer layer of the V-groove region is provided with weak adhering strength with the substrate and accordingly, the polymer layer is exfoliated and the V-groove is exposed.

A semiconductor laser 13 is mounted to the electrode 12 of the fabricated substrate by using AuSn solder and a single mode fiber is mounted and adhered to the V-groove 2 to thereby fabricate an optical transmitter module.

According to the transmitter module, there is shown excellent optical output 2 mW or more by 30 mA at room temperature. Further, a photodiode 13 of a waveguide type is mounted to the electrode 12 of the fabricated substrate by using AuSn solder and a single mode fiber is mounted and adhered to the V-groove to thereby fabricate an optical receiver module. According to the receiver module, there is shown excellent received sensitivity equal to or larger than 0.8 A/W.

<Embodiment 6>

Figure 12:
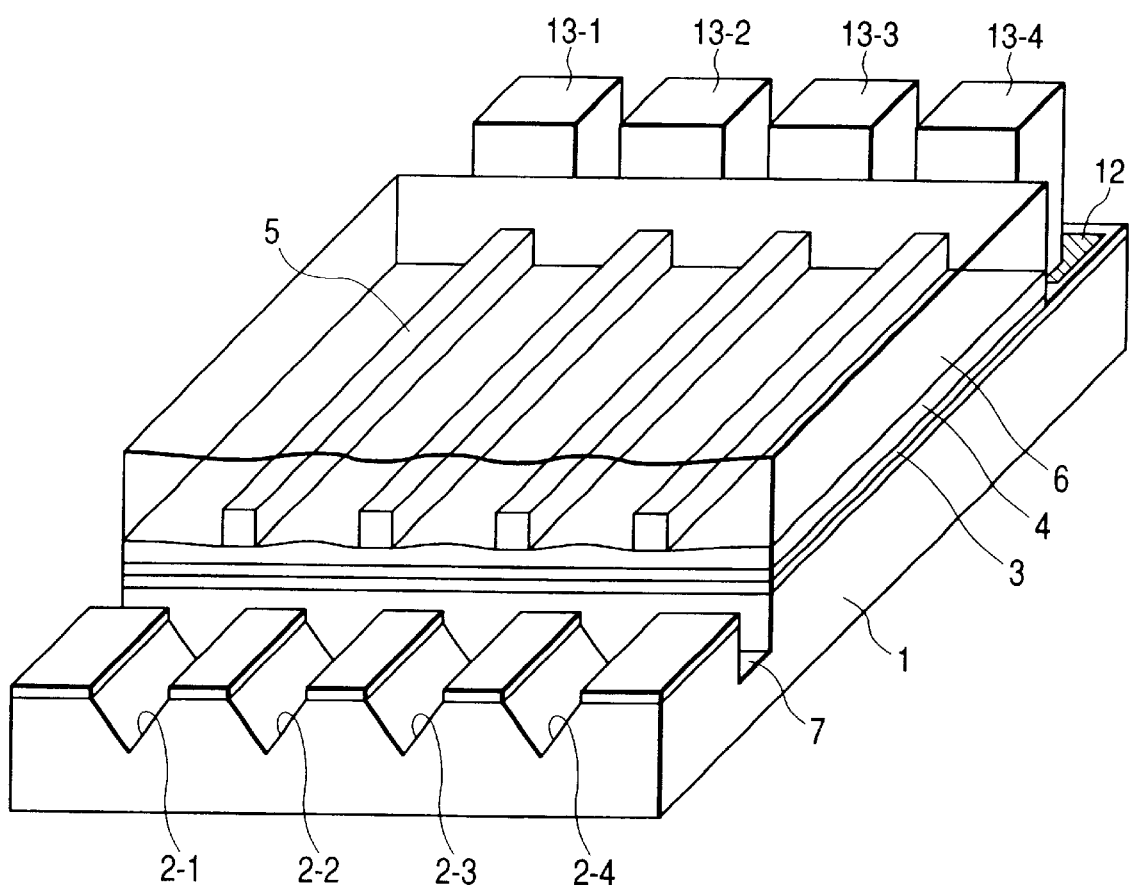
FIG. 12 is a perspective view for explaining other example of an optical transmitter (or optical receiver module) module according to an embodiment of the present invention.

This is an example of a module mounted with a larger number of optical fibers. FIG. 12 shows a perspective view of a structure of a waveguide substrate for an optical transmitter (or optical receiver) module according to the present invention. By mounting four pieces of optical fiber array to, for example, V-grooves 2-1 through 2-4 of the substrate, there can be realized a transmitter (or receiver) module for optical interconnection using parallel optical transmission (4ch). Further, the embodiment of the present invention is naturally applicable to an optical module having a number of channels. The waveguide substrate and the module can be fabricated by a method similar to that of Embodiment 5 and therefore, in FIG. 12 omitting a detailed explanation thereof, parts similar to those in other embodiments are designated by the same notations.

<Embodiment 7>

Figure 13:
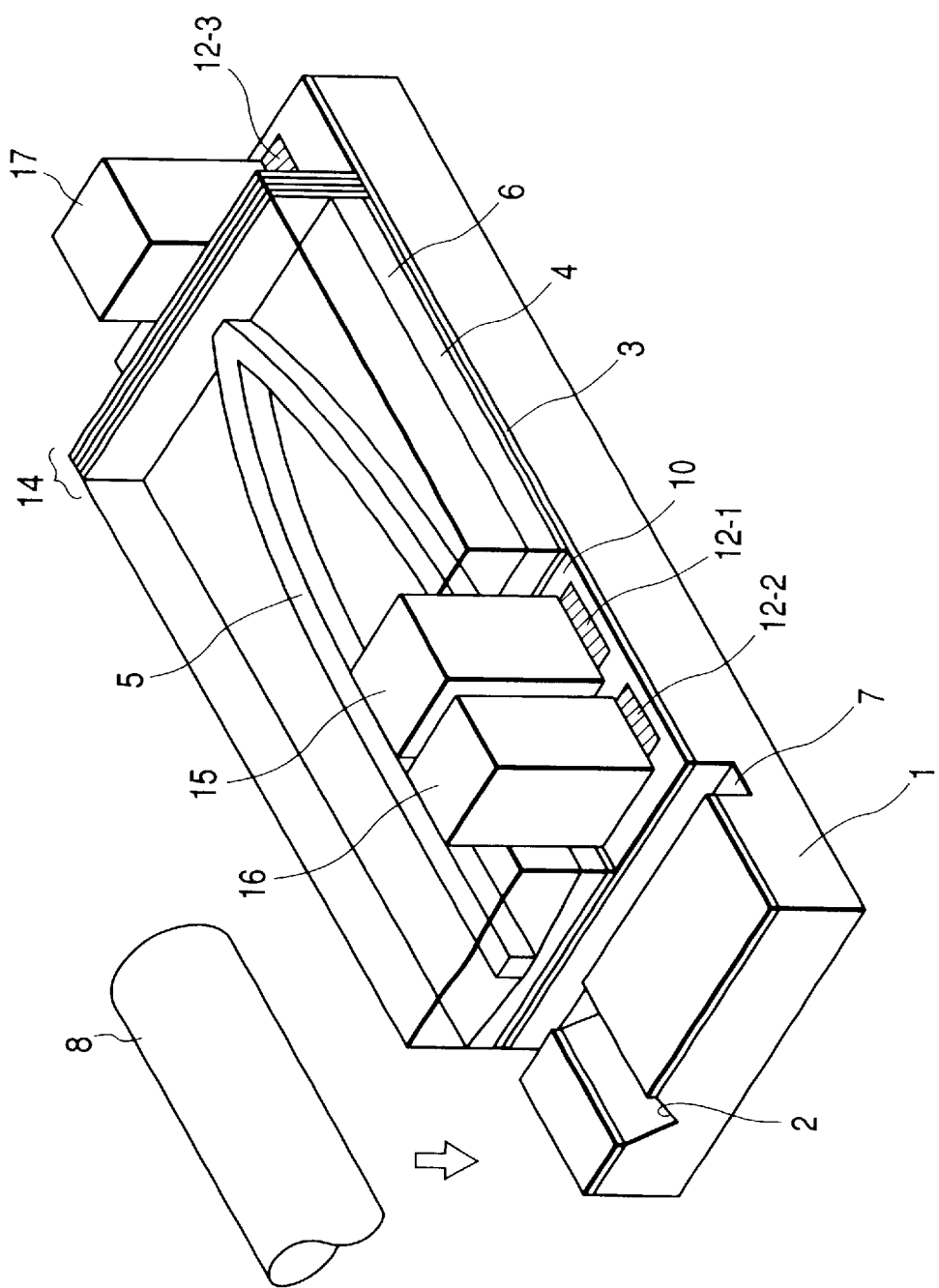
FIG. 13 is a perspective view for explaining an example of a wavelength-division-multiplexing (WDM) bi-directional optical transceiver module according to an embodiment of the present invention.

This example is an example of a bi-directional optical transceiver module using wavelength division multiplexing. FIG. 13 shows a perspective view of an example of a bi-directional optical transceiver module using wavelength division multiplexing according to the embodiment of the present invention.

The example of the module is provided with a semiconductor laser 15 having a wavelength of 1.3 μm for transmitting an optical signal, a waveguide type photodiode 16 for monitor for monitoring an optical output and a waveguide type photodiode 17 for receiving a signal having a wavelength of 1.5 μm. Further, there is vapor-deposited a multiple layer film filter 14 for optically multiplexing and dividing light having a wavelength of 1.3 μm and light having a wavelength of 1.5 μm at an end face of an optical waveguide of polymer. The optical signal having the wavelength of 1.5 Am incident from the optical fiber 8, transmits through the multiple layer film filter 14 and is received by the photo diode 17. In the meantime, the optical signal having the wavelength of 1.3 μm emitted from the semiconductor laser is reflected by the multiple layer film filter 14 and is outputted from the optical fiber 8.

The optical module is fabricated by the following procedure. Similar to the previous embodiments, the V-groove 2 is formed at the silicon substrate 1 and the thermally oxidized silicon film 10 (thickness: 1.5 μm) is provided at the surface of the substrate. The width of the respective V-groove is set to 141.8 μm and the height of the center of a core of a mounted optical fiber is set to be 6.5 μm from the surface of the oxide film. Further, there are provided Cr/Au electrodes 12-1 through 12-3 used in mounting the semiconductor elements. Similar to the previous embodiments, there is provided the adhering layer 3 (thickness: 0.5 μm) comprising polyimide silicone resin at the waveguide region. By successively coating and baking two kinds of fluorinated polyimide varnishes having different refractive indices, the lower clad layer 4 (n=1.520, t=3.3 μm) and the core layer 5 (n=1.526, t=6.0 μm) are formed. By a normal photoresist step and dry etching of oxygen, unnecessary portions of the core layer 5 are removed and a waveguide pattern having a V-like shape is formed. By coating and baking again fluorinated polyimide varnish, the upper clad layer 6 (n=1.520, t=15 μm) is provided. By using dry etching, portions of a polymer waveguide for mounting the elements are completely removed and the electrodes 12-1 through 12-3 are exposed. The groove 7 is provided at a boundary between the V-groove region and the waveguide region by using a dicing apparatus. Here, the width of the groove 7 is set to 150 μm and the position of the groove is set such that the V-groove region is cut by 50 μm and the waveguide region is cut by 100 μm. When the wafer is cut into the waveguide elements by dicing, a polymer layer of the V-groove region is provided with weak adhering strength with the substrate and accordingly, the polymer layer is exfoliated and the V-groove is exposed. The multiple layer film filter 14 is deposited at the end face of the waveguide by vacuum vapor deposition, the electrode 12-1 is mounted with the semiconductor laser 15, the electrode 12-2 is mounted with the waveguide type photodiode 16 for monitor, the electrode 12-3 is mounted with the waveguide type photodiode 17 having a wavelength of received light of 1.5 μm respectively by using AuSn solder and the optical fiber 8 is adhered to the V-groove 2.

There are achieved excellent characteristics such that an optical output of the fabricated module (transmission wavelength 1.3 μm/reception wavelength 1.5 μm) is 2 mW by laser current 30 mA and a light receiving sensitivity is 0.7 A/W. There is similarly fabricated an optical transceiver module having transmission wavelength 1.5 μm/reception wavelength 1.3 μm by setting a light emitting wavelength of the semiconductor laser 15 to 1.5 μm, setting a light receiving wavelength of the photodiode 17 to 1.3 μm and using the multiple layer film filter 14 for reflecting light having wavelength of 1.5 μm and transmitting light having wavelength of 1.3 μm. There are achieved excellent characteristics such that the optical output of the trially fabricated module is 1.5 mW by laser current of 30 mA and the light receiving sensitivity is 0.6 A/W.

Figure 14:
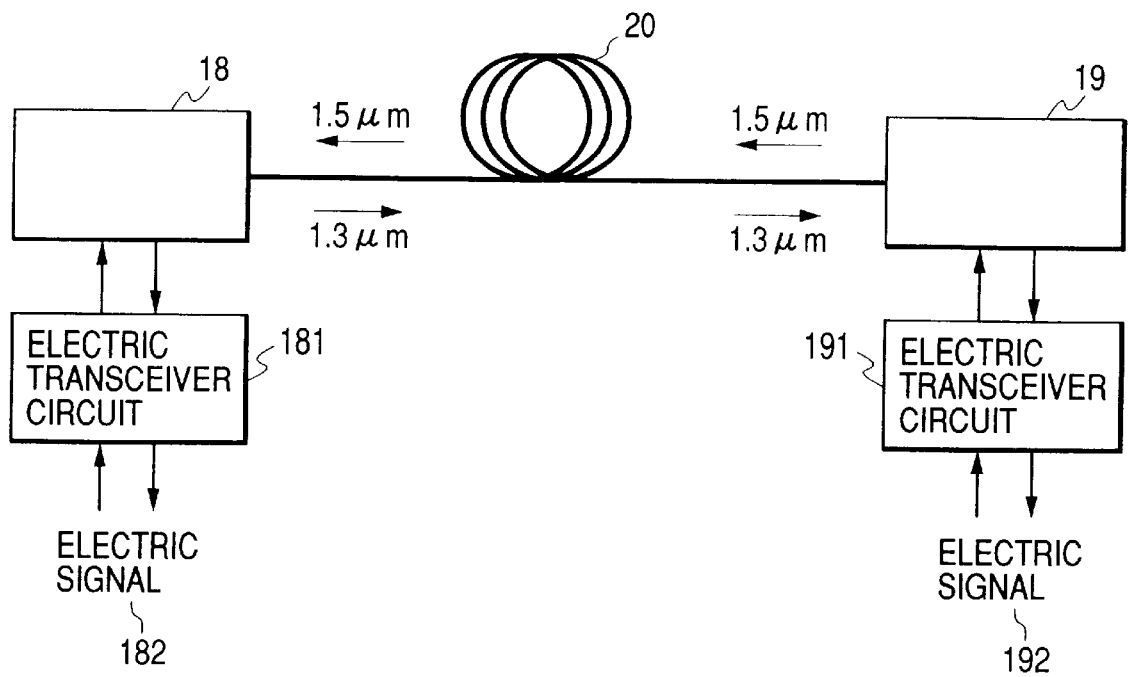
FIG. 14 is a view showing an example of an optical communication apparatus using a wavelength-division-multiplexing (WDM) bi-directional optical transceiver module according to an embodiment of the present invention.

FIG. 14 shows an example of an optical communication apparatus constituted by using the two kinds of fabricated transceiver modules. In FIG. 14, notation 18 designates a wavelength division multiplexing bi-directional optical transceiver module capable of transmitting a wavelength band of 1.3 μm and receiving a wavelength band of 1.5 μm according to the embodiment of the present invention and is controlled by an electric transceiver circuit 181 based on an electric signal 182. Notation 19 designates a wavelength band wavelength division multiplexing bi-directional optical transceiver module capable of transmitting the wavelength band of 1.5 μm and receiving the wavelength band of 1.3 μm according to the embodiment of the present invention and is controlled by an electric transceiver circuit 191 based on an electric signal 192. The two wavelength division multiplexing bi-directional optical transceiver modules 18 and 19 are connected by an optical fiber 20. The apparatus can transmit 600 Mbit/s bi-directionally and free of error up to a fiber length of 15 km or more.

<Embodiment 8>

Figure 15:
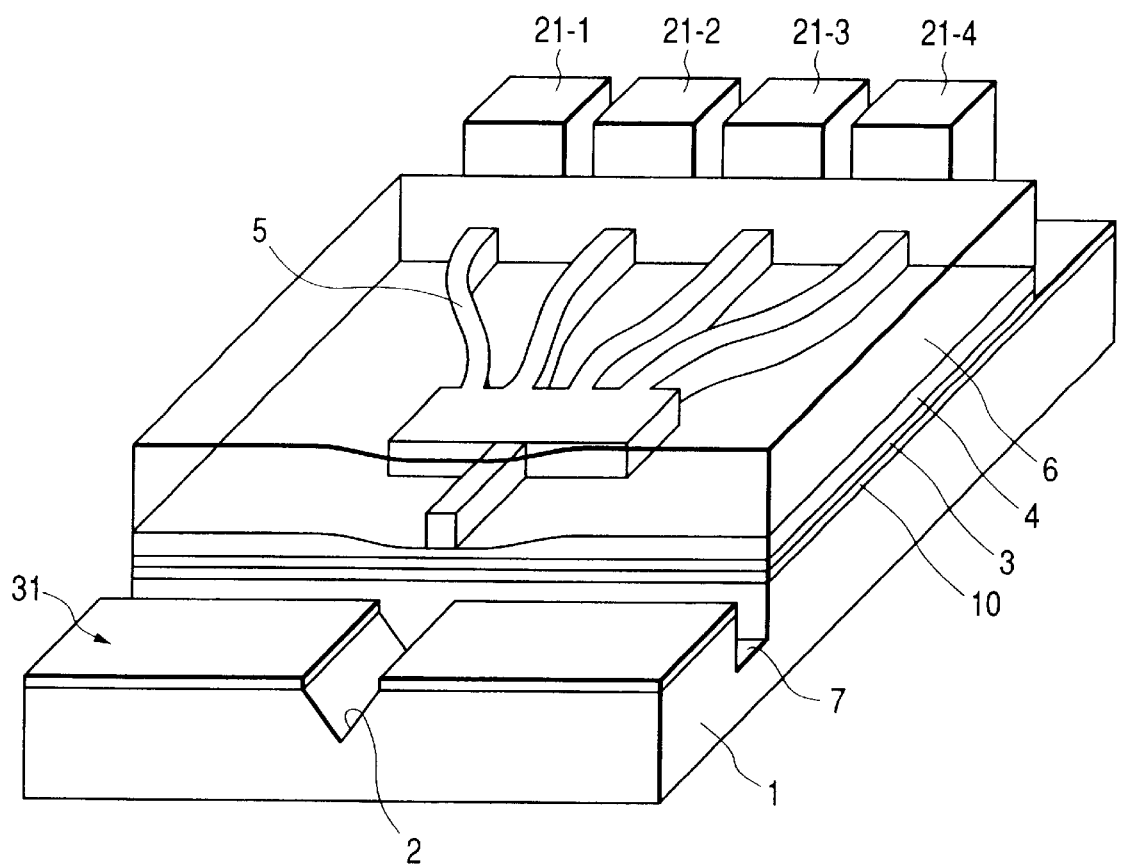
FIG. 15 is a perspective view for explaining an example of a wavelength-division-multiplexing (WDM) optical transmitter module according to an embodiment of the present invention.

This example is an example of a wavelength division multiplexing optical transmitter module. FIG. 15 shows a perspective view of the example of the wavelength division multiplexing transmitter module according to the embodiment of the present invention. The module is provided with four of DFB lasers 21-1 through 21-4 having different wavelengths and four waves of optical signals emitted from the respective lasers are multiplexed by a 1×4 multiplexer comprising a polymer waveguide and outputted from an optical fiber fixed to the V-groove 2.

The module is fabricated by the following procedure. The V-groove 2 is formed at the silicon substrate by a method similar to that of the previous embodiments and the thermally oxidized silicon film 10 (thickness: 1.0 µm) is provided at the surface of the substrate. Here, the width of the respective V-groove is set to 141.1 µm and the height of the center of a core of a mounted optical fiber is set to be 7.5 µm from the surface of the oxide film. Further, there are provided Ti/Pt/Au electrodes used in mounting DFB lasers (distributed feedback laser diode: DFB-LD) in a shape of a thermally oxidized film. By subjecting an entire face of the substrate to spin coating and baking respectively by a solution of zirconia chelate and polyimide not including fluorine, the adhering layer 3 (thickness: 0.5 µm) comprising an organic zirconia oxide and polyimide is provided over the entire face of the substrate. By a photoresist step and dry etching, the adhering layer of the V-groove region 31 is removed. By successively coating and baking two kinds of fluorinated polyimide varnishes having different refractive indices, the lower clad layer 4 (n=1.520, t=4.3 µm) and the core layer 5 (n=1.526, t=6.0 µm) are formed. By a photoresist step and dry etching of oxygen, unnecessary portions of the core layer are removed to thereby form a pattern of a 1×4 multiplexer and divider. By coating and baking again the fluorinated polyimide varnish, the upper clad layer 6 (n=1.520, t=20 µm) is provided. By using dry etching, portions of a polymer waveguide for mounting elements are completely removed and the electrode of a mounting portion are exposed. By using a dicing apparatus, the groove 7 is provided at a boundary between the V-groove region and the waveguide region. Here, the width of the groove 7 is set to 150 µm and the position of the groove is set such that the V-groove region is cut by 50 µm and the waveguide region is cut by 100 µm. When the wafer is cut into waveguide elements by dicing, a polymer layer of the V-groove region is exfoliated since the adhering strength with the substrate is weak and the V-groove is exposed.

Figure 16:
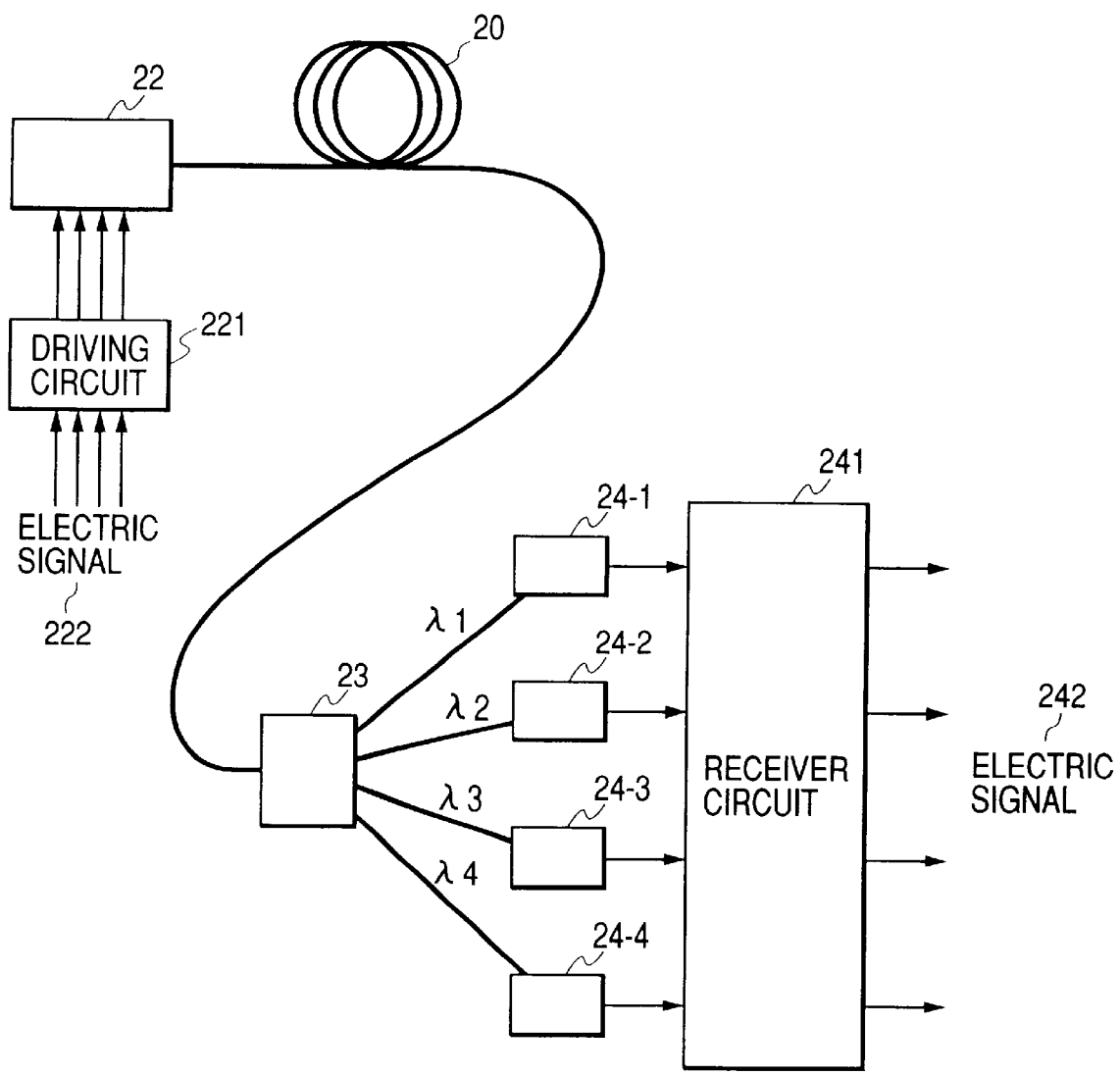
FIG. 16 is a view showing an example of an optical communication apparatus using a wavelength-division-multiplexing (WDM) optical transmitter module according to an embodiment of the present invention.

The fabricated substrate is mounted with four of DFEB lasers 21-1 through 21-4 having different light emitting wavelengths (wavelength: 1280 nm, 1300 nm, 1320 nm, 1340 nm) and an optical fiber is fixed to the V-groove 2 by a UV adhering agent. A communication apparatus is fabricated by using the fabricated optical module. FIG. 16 is a view showing the state. A wavelength division multiplexing optical transmitter module 22 capable of emitting four different wavelengths according to the present invention, is controlled by a driving circuit 221 based on an electric signal 222. For example, signals of 2.5 Gbit/s 4ch are converted into four wavelengths of wavelength division multiplexing signals by the wavelength division multiplexing optical transmitter module 22 according to the present invention and are transmitted through the optical fiber 20. The signal is divided into four wavelengths by a wavelength divider 23 and optical signals of respective wavelengths are converted into electric signals by receiver modules 24-1, 24-2, 24-3 and 24-4. The electric signal system is transmitted to desired circuits as electric signals 242 by receiving circuit 241. The communication system is operated free of error up to a fiber length of 10 km or more.

As has been explained above by various embodiments, according to the embodiment of the present invention, there can be provided the polymer optical waveguide substrate having the V-groove for fiber alignment capable of optically coupling with an optical fiber with low loss. By using the optical waveguide substrate, low cost formation and high function formation of the optical module can be achieved.

According to the embodiment of the present invention, there can be provided the optical waveguide members capable of being fabricated easily at low cost.

Further, according to the embodiment of the present invention, there can be provided the method of fabricating the optical waveguide members capable of being fabricated easily at low cost.

The technical matter related to the embodiment of the present invention is as follows.

There is provided a method of fabricating an optical waveguide member characterized in comprising a step of forming a groove portion in a shape of V at a silicon substrate, a step of forming a layer of an adhering material at an upper face of a region which is a flat region constituting the groove portion in the shape of V and is present in a direction of progressing light of the optical waveguide, a step of forming a first resin layer constituting a core layer of the optical waveguide and a second resin layer constituting a clad layer of the optical waveguide by covering at least the groove portion in the shape of V and a flat region constituting the groove portion in the shape of V of the silicon substrate prepared in this way, a step of forming a second groove portion having a wall face opposed to an end face of the optical waveguide and a step of removing at least the first and the second respective resin layers present above the flat region constituting the groove portion in the shape of V present along the direction of progressing light of the optical waveguide.

What is claimed is:

1. An optical waveguide member characterized in that an optical waveguide is formed at a portion over a silicon substrate, a core or a clad of the optical waveguide comprises a polymer resin, a groove in a shape of V for positioning and fixing an optical fiber to the optical waveguide and a groove extended in a direction orthogonal to the groove in the shape of V at a boundary of the optical waveguide, are provided to the silicon substrate, a film thickness of the core or the clad constituting the optical waveguide becomes thinner at a vicinity of the boundary than a film thickness of other portion and the shape of the groove having the shape of V is set such that when the optical fiber is mounted to the V-groove in the shape of V, a height of a center of a core of the optical fiber becomes a height lower than a height of a center of the core of the optical waveguide at a portion thereof at which the film thickness more remote from the boundary than the groove in the shape of V is substantially flat.

2. The optical waveguide member according to claim 1, characterized in that a film comprising an inorganic material is provided at a surface of the silicon substrate, the waveguide is formed over the inorganic film and the film comprising the inorganic material is operated as a clad layer.

3. The optical waveguide member according to claim 2, characterized in that an adhering layer for promoting an adhering performance between the polymer resin constituting the optical waveguide and the film comprising inorganic material is provided between the film comprising inorganic material and the optical waveguide.

4. The optical waveguide member according to claim 1, characterized in that an adhering layer for promoting an adhering performance between the polymer resin constituting the optical waveguide and the silicon substrate is provided between the silicon substrate and the optical waveguide.

5. An optical waveguide member characterized in comprising a groove portion in a shape of V, a silicon substrate having a flat region opposed to the groove portion in the shape of V by interposing a second groove portion in a direction of extending the groove portion in the shape of V and an optical waveguide provided along the groove portion in the shape of V and opposed to a predetermined wall face of the second groove portion, wherein the optical waveguide includes a first resin layer constituting a core layer of the optical waveguide and a second resin layer constituting a clad layer of the optical waveguide above the flat region, thicknesses of the first and the second respective resin layers are reduced at a vicinity of an end face of the flat region opposed to the first groove portion and an end face of the optical waveguide is opposed to the said end face of the flat region.

6. The optical waveguide member according to claim 5, characterized in that a film comprising an inorganic material is provided at a surface of the silicon substrate, the waveguide is formed over the inorganic film and the film comprising the inorganic material is operated as the clad layer.

7. The optical waveguide according to claim 6, characterized in that an adhering layer for promoting an adhering performance between the polymer resin constituting the optical waveguide and the film comprising inorganic material is provided between the film comprising inorganic material and the optical waveguide.

8. The optical waveguide member according to claim 5, characterized in that an adhering layer for promoting an adhering performance between a polymer resin constituting the optical waveguide and the silicon substrate is provided between the silicon substrate and the optical waveguide.

9. A method of fabricating an optical waveguide member for coupling optically an optical waveguide and an optical fiber by forming a V-groove and the optical waveguide over a silicon substrate, and fixing the optical fiber to the V-groove, wherein the method of fabricating the optical waveguide member comprises the steps of:

(a) forming the V-groove in a first area on a surface of the silicon substrate having the first area for the V-groove and a second area for the optical waveguide;

(b) forming an adhering layer on the second area for intensifying an adhering force between the surface of the silicon substrate and a polymer provided on the surface of the silicon substrate;

(c) terming a lower clad layer and a core layer with a polymer on the first and second areas;

(d) processing the core layer into a shape of a waveguide pattern, (e) forming the optical waveguide by forming an upper clad layer with a polymer on the exposed lower clad layer and the processed core layer;

(f) forming a second groove on the silicon substrate between the V-groove arid the optical waveguide so that an end of the optical fiber may contact an end portion of the optical waveguide, wherein the second groove is perpendicular to the longitudinal direction of the V-groove; and (g) removing the optical waveguide layer formed on the first area, wherein a thickness of the core layer or a thickness of each of the clad layers at the vicinity of the boundary between the optical waveguide and the second groove is thinner than a thickness at the other portion of the optical waveguide; and the V-groove is formed so that a height at a center of the optical fiber becomes lower than a height at a center of the core layer of the optical waveguide at an approximately flat region of thickness of the V-groove remote from the boundary, when the optical fiber is mounted in the V-groove.

10. The method according to claim 9, wherein an inorganic film is provided at a surface of the silicon substrate, and the adhering layer is for intensifying an adhering force between the inorganic film and the polymer.

11. The method according to claim 10, wherein the inorganic film functions as a part of the lower clad layer.

12. An optical waveguide member for coupling optically an optical waveguide and an optical fiber provided on a silicon substrate by fixing the optical fiber into a V-groove, wherein the optical waveguide member is fabricated through the following steps:

(a) forming the V-groove in a first area on a surface of the silicon substrate, said silicon substrate the first area and a second area for the optical waveguide;

b) forming an adhering layer on the second area for intensifying an adhering force between the surface of the silicon substrate and a polymer provided on the surface of the silicon substrate;

(c) forming a lower clad layer and a core layer with a polymer on the first and second areas;

d) processing the core layer into a shape of a waveguide pattern;

(e) forming the optical waveguide by forming an upper clad layer with a polymer on the exposed lower clad layer and the processed core layer;

(f) forming a second groove on the silicon substrate between the V-groove and the optical waveguide so that an end of the optical fiber may contact an end of the optical waveguide, wherein the second groove is perpendicular to a longitudinal direction of the V-groove; and (g) removing the optical waveguide layer on the first area, wherein a thickness of the core layer or a thickness of each of the clad layers at the vicinity of the boundary between the optical waveguide and the second groove is thinner than a thickness at the other portion of the optical waveguide; and the V-groove is formed so that a height at a center of the optical fiber becomes lower than a height at a center of the core layer of the optical waveguide in an approximately flat region of thickness of the V-groove remote from the boundary, when the optical fiber is mounted in the V-groove.

13. The optical waveguide member according to claim 12, wherein an inorganic film is provided at surface of the silicon substrate, and the adhering layer is for intensifying an adhering force between the inorganic film and the polymer.

14. The optical waveguide member according to claim 13, wherein the inorganic film functions as a part of the lower clad layer.

* * * * *